United States Patent
Numaguchi et al.

(10) Patent No.: US 9,229,528 B2
(45) Date of Patent: Jan. 5, 2016

(54) INPUT APPARATUS USING CONNECTABLE BLOCKS, INFORMATION PROCESSING SYSTEM, INFORMATION PROCESSOR, AND INFORMATION PROCESSING METHOD

(71) Applicant: Sony Computer Entertainment Inc., Tokyo (JP)

(72) Inventors: Naoki Numaguchi, Tokyo (JP); Hiroshi Osawa, Kanagawa (JP); Takeshi Yamagishi, Kanagawa (JP); Keiji Togawa, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 210 days.

(21) Appl. No.: 14/026,019

(22) Filed: Sep. 13, 2013

(65) Prior Publication Data

US 2014/0015813 A1 Jan. 16, 2014

Related U.S. Application Data

(63) Continuation of application No. PCT/JP2012/004549, filed on Jul. 13, 2012.

(51) Int. Cl.
*G06F 3/01* (2006.01)
*G06T 17/00* (2006.01)
(Continued)

(52) U.S. Cl.
CPC ........ *G06F 3/01* (2013.01); *G06F 3/011* (2013.01); *G06F 3/0346* (2013.01);
(Continued)

(58) Field of Classification Search
CPC ......... G06T 17/00; G06T 19/00; G06T 13/00; G06T 19/20; G06T 2213/08; G06T 2219/2021; G06T 2219/2008; A63H 3/16; B25J 9/08; B25J 9/065; G06F 3/011; G06F 3/04815

See application file for complete search history.

(56) References Cited

U.S. PATENT DOCUMENTS

| 5,766,077 A | 6/1998 | Hongo |
| 2002/0095276 A1* | 7/2002 | Rong et al. ............... 703/2 |

(Continued)

FOREIGN PATENT DOCUMENTS

| JP | 09047575 A | 2/1997 |
| JP | 2002219279 A | 8/2002 |
| WO | 2007050885 A2 | 5/2007 |

OTHER PUBLICATIONS

Michael Philetus Weller, Ellen Yi-Luen Do, Mark D Gross, "Posey: Instrumenting a Poseable Hub and Strut Construction Toy," Proceedings of the Second International Conference on Tangible and Embedded Interaction, pp. 39-46, (Feb. 2008).

(Continued)

*Primary Examiner* — Michael J Eurice
(74) *Attorney, Agent, or Firm* — Matthew B. Dernier, Esq.

(57) ABSTRACT

A block tool, which can be assembled by a user, is configured with multiple types of blocks and is shot by a camera for capturing a still image or a moving image. The position coordinates of a marker of the square-pillar block in a three-dimensional space are obtained by image recognition. Also, a connecting position and the type of each block, a gradient vector of the square-pillar block, an angle between two blocks constituting the square-pillar block, and the respective blocks' lengths are obtained so as to derive the shape, posture, and position of the block tool, and corresponding information processing is then performed.

13 Claims, 13 Drawing Sheets

(51) Int. Cl.
*G06F 3/0481* (2013.01)
*G06T 19/20* (2011.01)
*G06F 3/0346* (2013.01)
*G06T 13/00* (2011.01)
*A63H 3/16* (2006.01)
*B25J 9/06* (2006.01)
*B25J 9/08* (2006.01)

(52) U.S. Cl.
CPC ........... *G06F 3/04815* (2013.01); *G06T 17/00* (2013.01); *G06T 19/20* (2013.01); *A63H 3/16* (2013.01); *B25J 9/065* (2013.01); *B25J 9/08* (2013.01); *G06T 13/00* (2013.01); *G06T 2213/08* (2013.01); *G06T 2219/2008* (2013.01); *G06T 2219/2021* (2013.01)

(56) References Cited

U.S. PATENT DOCUMENTS

| 2002/0196250 | A1* | 12/2002 | Anderson et al. | 345/420 |
| 2003/0052875 | A1* | 3/2003 | Salomie | 345/419 |
| 2003/0125099 | A1* | 7/2003 | Basson et al. | 463/7 |
| 2010/0292836 | A1* | 11/2010 | Cheung et al. | 700/245 |
| 2011/0208492 | A1* | 8/2011 | Xu et al. | 703/2 |

OTHER PUBLICATIONS

International Search report for corresponding PCT Application No. PCT/JP2012/004549, dated Oct. 23, 2012.
International Preliminary Report on Patentability and Written Opinion for corresponding PCT Application No. PCT/JP2012/004549, dated Jan. 22, 2015.

* cited by examiner

150

| IDENTIFICATION NUMBER 162 | SHAPE 164 | SIZE 166 | CONNECTING PART 168 |
|---|---|---|---|
| 1 | SQUARE PILLAR | 4 × 4 × 8 | J1(1, 2, 2)<br>J2(2, 1, 2)<br>J3(2, 4, 2)<br>J4(2, 7, 2)<br>...... |
| 2 | SQUARE PILLAR | 3 × 4 × 6 | J1(1, 1.5, 1.5)<br>J2(2, 1, 1.5)<br>J3(2, 3, 1.5)<br>.... |
| 3 | CUBE | 4 × 4 × 4 | J1(1, 2, 2)<br>J2(2, 2, 2)<br>.... |
| .... | .... | .... | .... |

160

INPUT APPARATUS USING CONNECTABLE BLOCKS, INFORMATION PROCESSING SYSTEM, INFORMATION PROCESSOR, AND INFORMATION PROCESSING METHOD

CROSS REFERENCE TO RELATED APPLICATIONS

This is a continuation application claiming priority to PCT/JP2012/004549, filed Jul. 13, 2012, the entire disclosure of which is hereby incorporated by reference.

BACKGROUND OF THE INVENTION

1. Field of the Invention

The present invention relates to an information processing technique using an object in a real space.

2. Description of the Related Art

There has been conventionally used, in a variety of fields, a technique of measuring a parameter related to an object, such as a human or substance, in a real space using some means, and using the parameter as an input value for a computer so as to perform analysis or display an image. In the field of computer games, motion of a user or of a marker held by a user is acquired and a character in a virtual world within a display screen is made to move according thereto, for example, thereby realizing intuitive and easy operation (see WO 2007/050885 A2, for example). Such a technique of reflecting in the screen display a change in the motion or shape of an object in a real space is expected to be applied to toys or learning materials besides games (see Michael Philetus Weller, Ellen Yi-Luen Do, Mark D Gross, "Posey: Instrumenting a Poseable Hub and Strut Construction Toy," Proceedings of the Second International Conference on Tangible and Embedded Interaction, 2008, pp 39-46, for example).

In order to create the realism of the scenes and enable intuitive operation in the aforementioned case where an operation on an object is used as an input value to perform information processing, it is important to provide perceived affordance. For example, there may be provided an apparatus that resembles the shape of a real object, such as a steering wheel or a pistol, and is operable in a similar way, but the uses of the apparatus are limited. If the shape of such an apparatus is made variable, the range of the uses will be expanded, but some ingenuity need be exercised to measure a change in the shape or motion of the apparatus.

In the technique disclosed in the document of Weller et. al, for example, an infrared LED and a photo sensor for receiving light from the LED are embedded in a joint part of a component, so as to measure the rotation angle of the component and identify the shape. In this case, the measurable rotation angles are limited and so is the variable range of the shape. Also, since every part need be provided with such devices, manufacturing cost will be increased. In this way, if the form of the apparatus provided as an input means is made more flexible, the mechanism for measuring the form will be more complicated; as a result, manufacturing cost or processing cost tends to be increased.

RELATED ART LIST

WO 2007/050885 A2

Michael Philetus Weller, Ellen Yi-Luen Do, Mark D Gross, "Posey: Instrumenting a Poseable Hub and Strut Construction Toy," Proceedings of the Second International Conference on Tangible and Embedded Interaction, 2008, pp 39-46

SUMMARY OF THE INVENTION

The present invention has been made in view of such a problem, and a purpose thereof is to provide an input means applicable for a variety of uses at low cost.

One aspect of the present invention relates to an input apparatus. The input apparatus is configured with a plurality of blocks connectable to each other, and at least one of the plurality of: blocks comprises at least one of a position acquisition unit provided with a mechanism to acquire a position in a three-dimensional space; a connecting part identification unit configured to acquire a position to which another block is connected; a sensor measurement acquisition unit configured to acquire a measurement of an embedded sensor; an inclination identification unit configured to acquire an inclination; and an information transmitting unit configured to transmit information acquired internally to an information processor that uses a signal from the input apparatus as an input value to perform information processing in accordance with the position, posture, and shape of the input apparatus.

The "embedded sensor" is a sensor embedded in a block to measure a change in the block, such as an angle sensor or a pressure sensor, and a physical quantity measured by the sensor is not particularly limited.

Another aspect of the present invention relates to an information processing system. The information processing system comprises an input apparatus configured with a plurality of blocks connectable to each other and an information processor configured to perform information processing on the basis of an input signal from the input apparatus. At least one of the plurality of blocks in the input apparatus comprises at least one of a position acquisition unit provided with a mechanism to acquire a position in a three-dimensional space, a connecting part identification unit configured to acquire a position to which another block is connected, a sensor measurement acquisition unit configured to acquire a measurement of an embedded sensor, an inclination identification unit configured to acquire an inclination, and an information transmitting unit configured to transmit information acquired internally to the information processor. The information processor comprises: a structural analysis unit configured to calculate a position, posture, and shape of the input apparatus in a three-dimensional space on the basis of information transmitted from the input apparatus; and an information processing unit configured to perform information processing in accordance with a result calculated by the structural analysis unit.

Yet another aspect of the present invention relates to an information processor. The information processor comprises: a block information receiving unit configured to receive, from an input apparatus formed by connecting blocks prepared separately, information on a connecting part of a block, the type of a connected block, a measurement of a sensor embedded in a block, and an inclination of a block and to acquire a position of a block in a three-dimensional space; a structural analysis unit configured to calculate a position, posture, and shape of the input apparatus in a three-dimensional space on the basis of information acquired by the block information receiving unit; and an information processing unit configured to perform information processing in accordance with a result calculated by the structural analysis unit.

Still yet another aspect of the present invention relates to an information processing method. The information processing method comprises processes performed by an information processor of: receiving, from an input apparatus formed by connecting blocks prepared separately, information on a connecting part of a block, the type of a connected block, and an inclination of a block; acquiring a position of a block in a three-dimensional space; calculating a position and shape of the input apparatus in a three-dimensional space on the basis of information received in the process of receiving and information acquired in the process of acquiring; performing information processing in accordance with a calculated result; and displaying a result of information processing on a display apparatus.

Optional combinations of the aforementioned constituting elements, and implementations of the invention in the form of methods, apparatuses, systems, computer programs, and recording media storing computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

In the present embodiment, multiple blocks are assembled or transformed, and the shape and position thereof are used as input values for information processing. Namely, such blocks can be considered as an input apparatus for an information processor. Processing performed by the information processor is not particularly limited, but a preferable embodiment will be exemplified later. Hereinafter, a group of such blocks or an assembly of such blocks will be collectively referred to as a "block tool".

Figure 1:
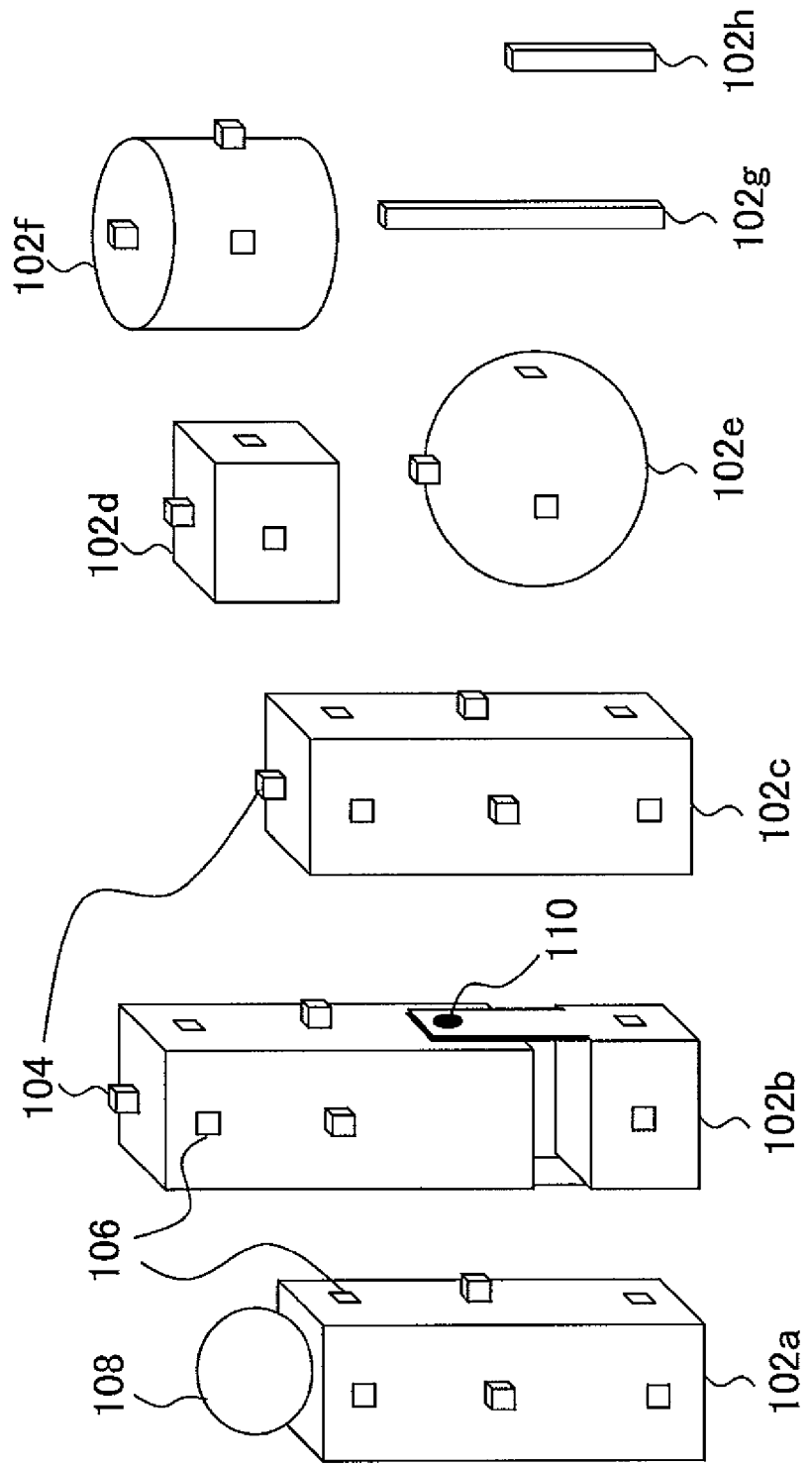
FIG. 1 is a diagram that shows an illustrative outline view of a block tool according to the present embodiment.

FIG. 1 shows an illustrative outline view of a block tool according to the present embodiment. A block tool is made of synthetic resin or the like and is configured so that a device or sensor can be embedded therein, as needed. As shown in FIG. 1, a block tool may include various shapes, such as square-pillar blocks 102a, 102b, and 102c, a cube block 102d, a cylindrical block 102f, and a spherical block 102e. The shapes of blocks are not limited to those exemplified, and the sizes of blocks may also be various. Further, multiple shapes may not necessarily be included.

Each block is provided with a convex portion 104 and a concave portion 106, which each have a predetermined size and shape, and blocks are configured to be connectable to each other at a desired position by fitting a convex portion 104 into a concave portion 106. In order to adjust a space between connected blocks, a block tool may further include joint blocks 102g and 102h of which each end can be fitted to the concave portion 106 of a different block. Also, if a joint block is rotatable, the positional relationship or postural relationship between blocks connected by the joint block can be changed.

The convex portions 104 and concave portions 106 also function as terminals that enable signal transmission between blocks. Accordingly, each of the portions has, at the tip, a connector having a structure appropriate to the standard of a bus or the like provided in the block. By employing various connectors in common use or providing a dedicated special connector, signal transmission and physical connection between blocks are enabled simultaneously. If a signal transmission path can be separately prepared and each connecting part can be specified, blocks may be connected to each other using a hook-and-loop fastener, a magnet, or the like. The signal transmission path separately prepared may be a wireless communication mechanism.

At least one block in a block tool (the square-pillar block 102a in the case of FIG. 1) is provided with a marker 108. The marker 108 is used to identify a position in a three-dimensional space according to the position and size of the marker in an image captured by a camera, which is described later. Accordingly, the marker 108 is formed to have a size, shape, and color that can be detected from a captured image by performing a matching process or the like. For example, the marker may be a spherical object made of light transmitting resin and having therein a general light-emitting body, such as a light emitting diode or a light bulb, or may be a two-dimensional code. When the marker 108 is provided in each of multiple blocks, the colors of the markers for the respective blocks may be made different from each other.

Also, at least one block in a block tool (the square-pillar block 102b in the case of FIG. 1) is configured with two blocks, a flexible axis 110 that makes the block flexible, and a potentiometer that detects an angle made by the two blocks. The mechanism to flex the block is not particularly limited, and, besides the configuration as shown in the figure in which convex portions of one block are joined to the ends of the flexible axis 110, which penetrates through another block, it may be a configuration in which the two blocks are connected using a hinge or flexible metal. Also, the angle between the two blocks may be made continuously changeable or made changeable in multiple levels. Further, the direction of the axis is not limited to that shown in the figure, and multiple axes may be provided in one block.

It is preferable that component blocks are configured so that the angle between the blocks is maintained even when the user releases a hand therefrom. The angle between the blocks may be measured using an angle sensor other than a potentiometer. For example, by embedding in a block a sensor for measuring a relative angle with respect to another block, the blocks may not necessarily be connected. Also, one block may be configured to be flexible and rotatable, as described later, and the flex angle and rotation angle may be measured.

Further, in at least one block in a block tool, one motion sensor or a combination of multiple motion sensors including an acceleration sensor, a gyro sensor, and a geomagnetic sensor are embedded. The block in which a sensor is embedded, the type of a sensor to be embedded, or the combination of sensors is determined depending on information processing to be performed using the block tool or is selected by a user from among various variations when blocks are assembled.

Figure 2:
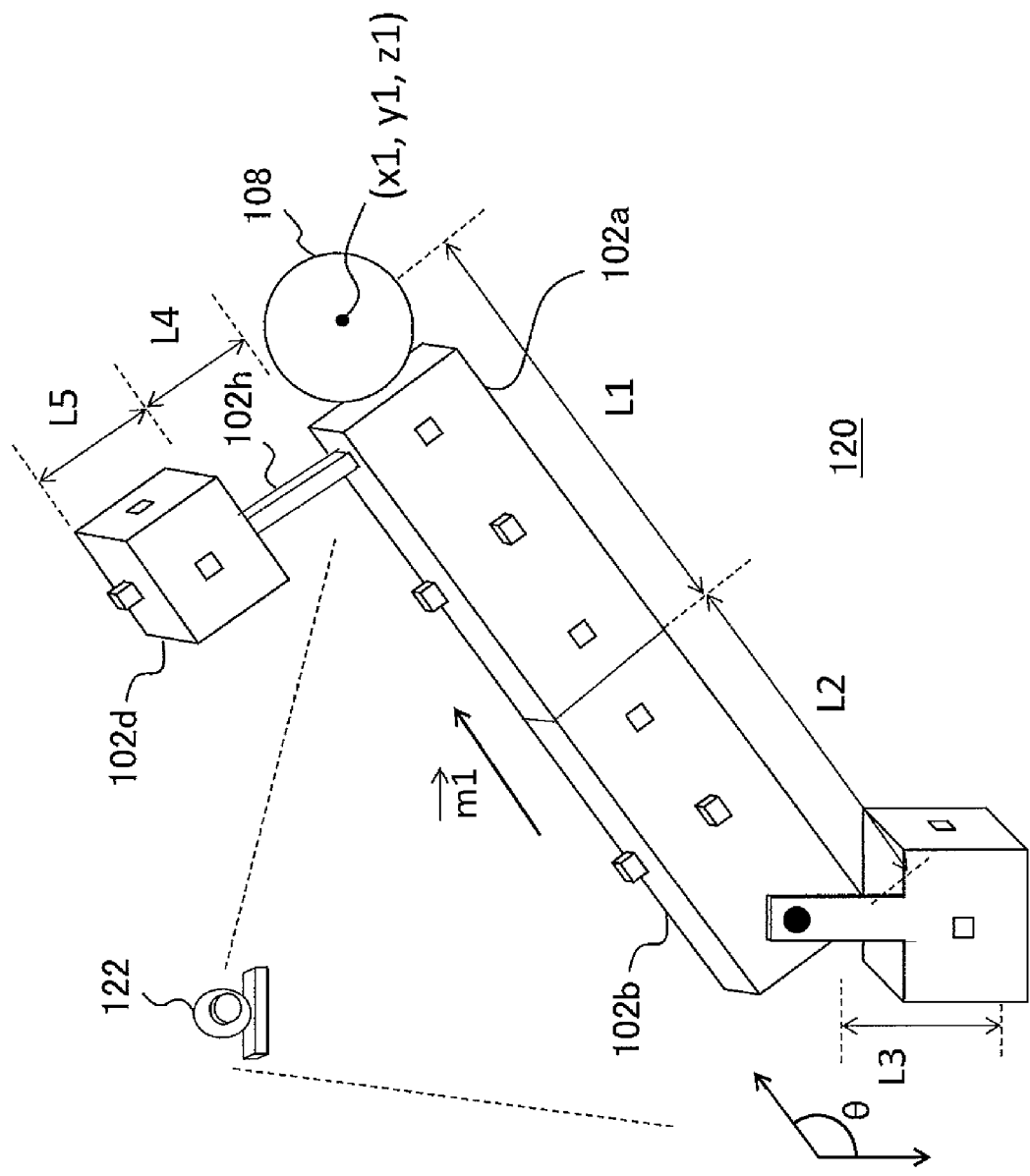
FIG. 2 is a diagram that shows an example of a block tool assembled in the present embodiment.

FIG. 2 shows an example of a block tool assembled by a user using blocks as shown in FIG. 1. A block tool 120 thus assembled is configured with the square-pillar blocks 102a and 102b, the cube block 102d, and the joint block 102h shown in FIG. 1. As mentioned previously, the block tool 120 is shot by a camera 122 that captures a still image or a moving image.

In a captured image, the image of the marker 108 of the square-pillar block 102a is detected. If a light-emitting body having a known color, luminance, and size is used as the marker 108, as stated previously, the image of the marker can be easily detected by searching a captured frame image according to corresponding conditions. Also, when a different marker is employed, a general image recognition technique, such as pattern matching and feature extraction, is applicable. When the block tool 120 is operated and a moving image thereof is captured, efficient detection can be achieved by adopting a conventional tracking technique.

The marker 108 may be an apparatus that emits invisible light, such as infrared light. In this case, an apparatus for detecting invisible light is used instead of the camera 122, so as to detect the position of the marker 108. Similarly, a depth sensor, an ultrasonic sensor, or a sound sensor may also be used. By including the marker 108 in a block tool, the position coordinates (x1, y1, z1) of the marker 108 in a real-world three-dimensional space can be obtained. Also, a stereo camera may be used as the camera 122 so as to obtain depth information of the block tool by stereo matching. Further, a touch panel may be provided on the upper surface of a stand on which the block tool 120 is placed, so as to detect the position of the block tool 120. By combining two or more of such absolute position detecting methods, the ultimate position coordinates may be calculated.

Concurrently with such calculation of the absolute position, necessary parameters are detected using a motion sensor or a potentiometer provided in a block, so as to efficiently calculate the position, posture, and shape of the block tool 120. In the case of the block tool 120 shown in FIG. 2, for example, the position coordinates and orientation of each block, and, in addition, the shape, position, and posture of the central axis of the block tool 120 can be derived based on: (1) a connecting position and the type of each block; (2) the gradient vector m1 of the square-pillar block 102a or 102b; (3) the angle θ between the two blocks constituting the square-pillar block 102b; and (4) the respective blocks' lengths L1, L2, L3, L4, and L5, and the aforementioned absolute position.

When the above parameters (1) and (4) can be obtained through signal transmission between the blocks and the parameter (3) can be measured using a potentiometer, it will be sufficient if a motion sensor is embedded in the square-pillar block 102a or 102b in order to measure the parameter (2). Alternatively, a block in which a motion sensor is embedded may be selected as the square-pillar block 102a or 102b.

Figure 3:
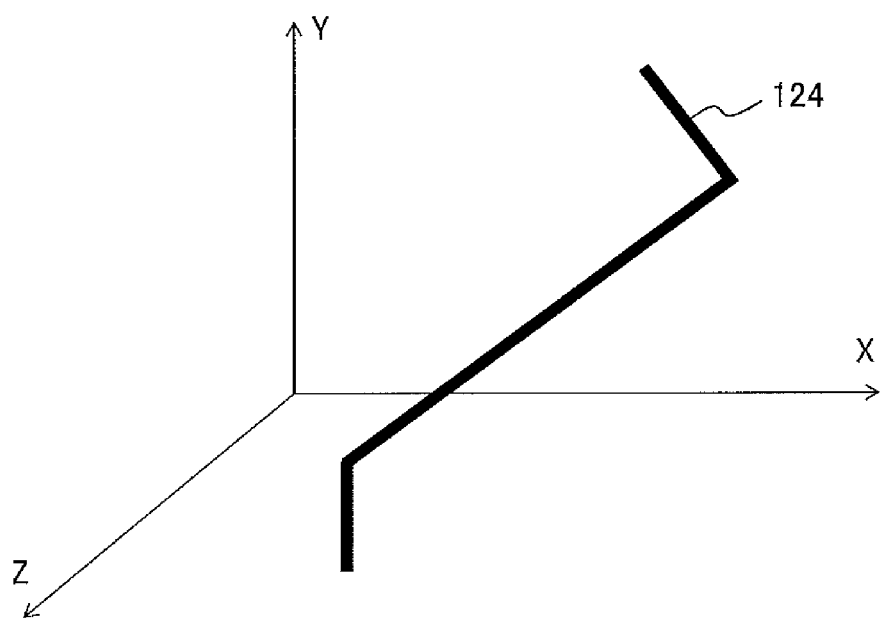
FIG. 3 is a diagram that schematically shows the central axis of a block tool derived in the present embodiment.

FIG. 3 schematically shows the central axis of the block tool 120 derived in such a way. As shown in FIG. 3, the position, posture, and shape of the central axis 124 are identified in a three-dimensional space. The three-dimensional space may be the camera coordinate system of the camera 122 or may be a desired coordinate system into which the camera coordinate system is converted.

In the present embodiment, various information processes are performed using, as input values, the central axis 124 or the position or orientation of each block obtained in this way. For example, an object may be rendered using the central axis 124 as the frame and the rendered image may be displayed. Also, the object model may be changed according to a change in the shape of the central axis, or such a change in the shape may be interpreted as a command so that information processing corresponding to the command will be performed. Although this example is a case where only the central axis 124 of the block tool is used as an input value, if the object is changed according to the size of the connected blocks, the shape of the block tool may be obtained also in consideration of the widths of the blocks in FIG. 2.

Figure 4:
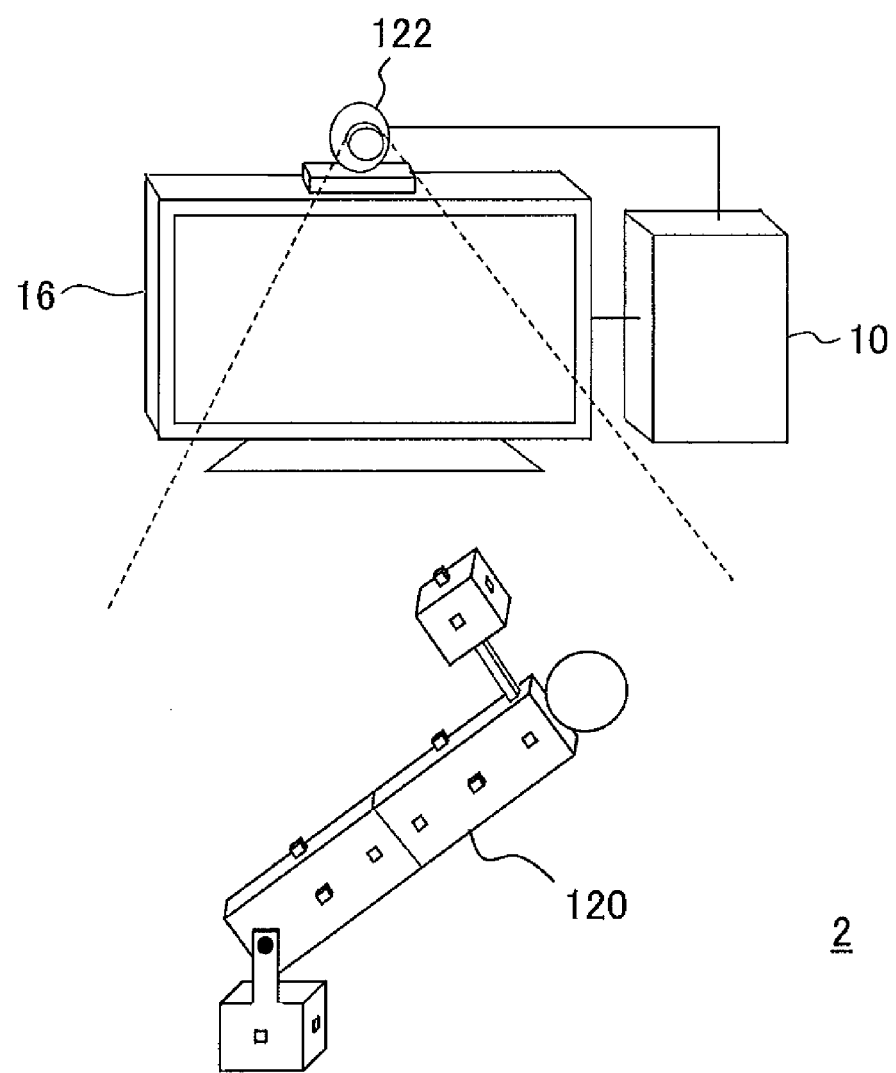
FIG. 4 is a diagram that shows an illustrative configuration of an information processing system to which the present embodiment is applicable.

FIG. 4 shows an illustrative configuration of an information processing system to which the present embodiment is applicable. An information processing system 2 comprises, besides the block tool 120 and the camera 122 for shooting the block tool 120, an information processor 10 that uses a shape, posture, and position of the block tool 120 as input values so as to perform predetermined information processing according thereto, and a display apparatus 16 that outputs image data obtained as a result of processing performed by the information processor. The information processor 10 may be a game device or personal computer, for example, which loads a necessary application program from a recording medium or a storage device to perform an information processing function. The display apparatus 16 may be a general display, such as a liquid crystal display, a plasma display, and an organic EL display. Alternatively, the display apparatus 16 may be a television equipped with such a display and a speaker.

The information processor 10 may be connected to the camera 122 or the display apparatus 16 by wired or wireless means, and they may be connected via various networks. Also, any two of or all of the camera 122, information processor 10, and display apparatus 16 may be combined and integrally provided. The camera 122 may not necessarily be mounted on the display apparatus 16. The block tool 120 may be provided in plurality depending on the processing performed by the information processor 10. Between the block tool 120 and information processor 10 is established a wireless connection using the Bluetooth (registered trademark) protocol or IEEE802.11 protocol. Alternatively, a block in the block tool 120 and the information processor 10 may be connected via a cable.

Figure 5:
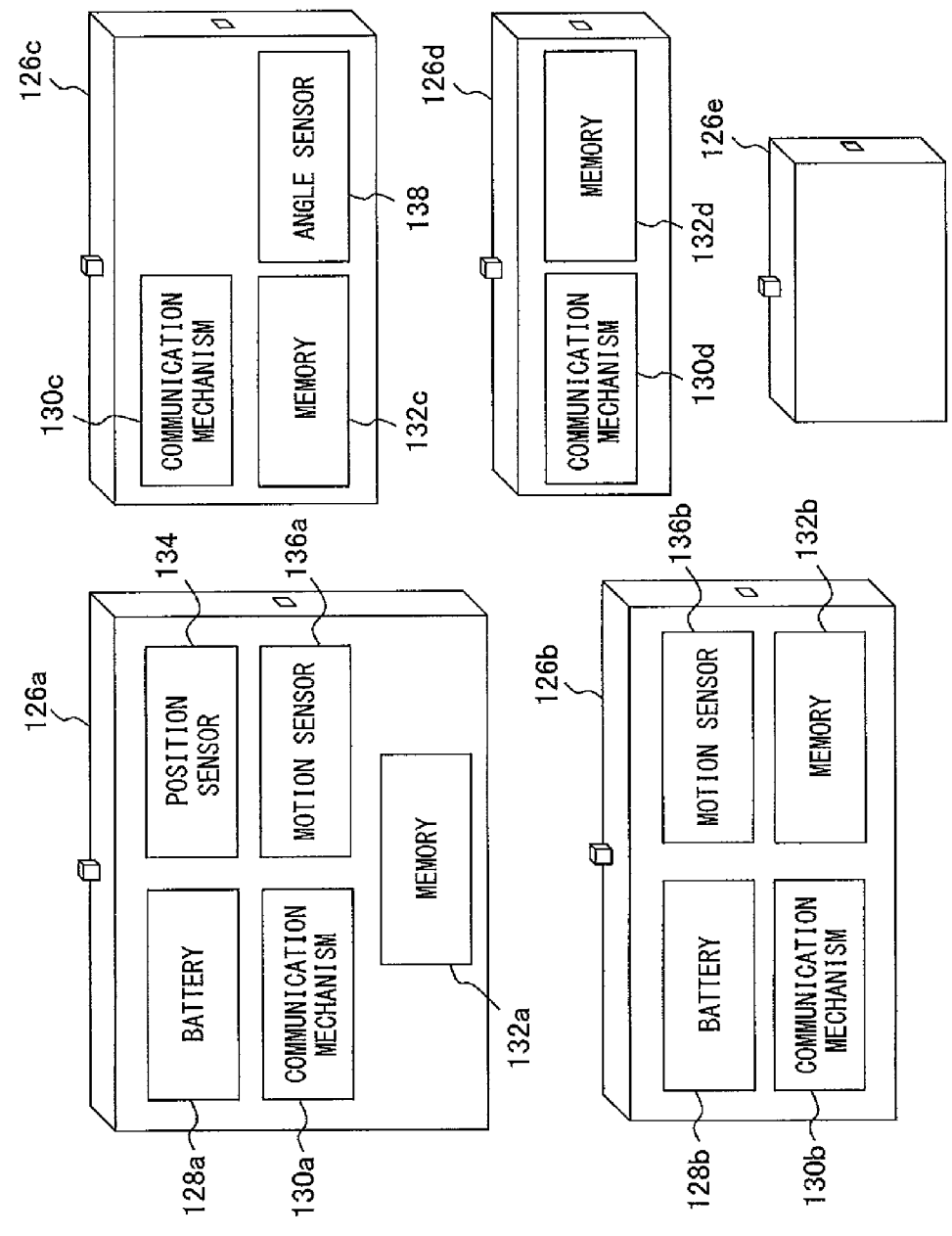
FIG. 5 is a diagram that schematically shows an illustrative internal configuration of each block included in a block tool according to the present embodiment.

FIG. 5 schematically shows an illustrative internal configuration of each block included in a block tool. As stated previously, by providing various variations in the internal configuration of a block, each block can be suitably used according to the use. Also, by distributing, among multiple blocks, sensors expected to be necessary to identify input values for information processing, equipment of excessive sensors can be prevented, thereby reducing the manufacturing cost.

In the example of FIG. 5, a block 126a comprises a battery 128a, a communication mechanism 130a, a memory 132a, a position sensor 134, and a motion sensor 136a. The communication mechanism 130a includes a mechanism for performing wireless communication with the information processor 10 in addition to a wired communication mechanism for receiving a signal from another block via a connection terminal. The memory 132a retains the identification number of the block 126a. The identification number is related, by the information processor 10, to information including the size of the block 126a and the positions of a concave portion and convex portion, and the same identification number may be assigned to the same type of blocks. Alternatively, the identification number may be uniquely set for each block so as to be used for routing of signal transmission within an assembled block tool.

The position sensor 134 is a sensor for acquiring the absolute position of the block 126a, and a marker for image recognition also corresponds thereto. In the case of a marker, an external camera is used in combination therewith to detect the absolute position, as mentioned previously. The motion sensor 136a is one of or a combination of two or more of an acceleration sensor, a gyro sensor, and a geomagnetic sensor, as also mentioned previously.

A block 126b comprises a battery 128b, a communication mechanism 130b, a memory 132b, and a motion sensor 136b. Each mechanism may be the same as that in the block 126a described above, but the communication mechanism 130b may be configured to have only a wired communication mechanism for receiving a signal from another block. Such a block is used in combination with the block 126a capable of communicating with the information processor 10. The same applies to the communication mechanisms in other blocks.

A block 126c comprises a communication mechanism 130c, a memory 132c, and an angle sensor 138. The angle sensor 138 is an example of a sensor embedded in a block and is a sensor for detecting a bend angle of the block 126c itself, as typified by a potentiometer provided in the square-pillar block 102b in FIG. 1. Since it does not have a battery, the block 126c is used in combination with another block provided with a battery, such as the block 126a or 126b. Blocks to be prepared besides the aforementioned blocks include a block 126d that is only provided with a communication mechanism 130d and a memory 132d, and a block 126e that is not provided with any sensor or mechanism.

The blocks shown in FIG. 5 are intended to be illustrative only, and any combinations of various sensors and other mechanisms are available. Also, besides the sensors shown in the figure, a bend sensor, a pressure sensor, or any other practical sensor may be embedded. Blocks having such various internal configurations and having various shapes as shown in FIG. 1 are prepared. The same type of blocks may be prepared in plurality. Also, all the blocks may have the same shape and the same size or may have the same internal configuration. If various variations are provided in the shape or internal configuration of a block and if the blocks are made to be individually purchasable, each user can flexibly assemble a desired block tool according to the use at the minimum cost. Also, a set of blocks with which basic assembly is enabled may be provided first, and other blocks may be additionally purchased later.

Figure 6:
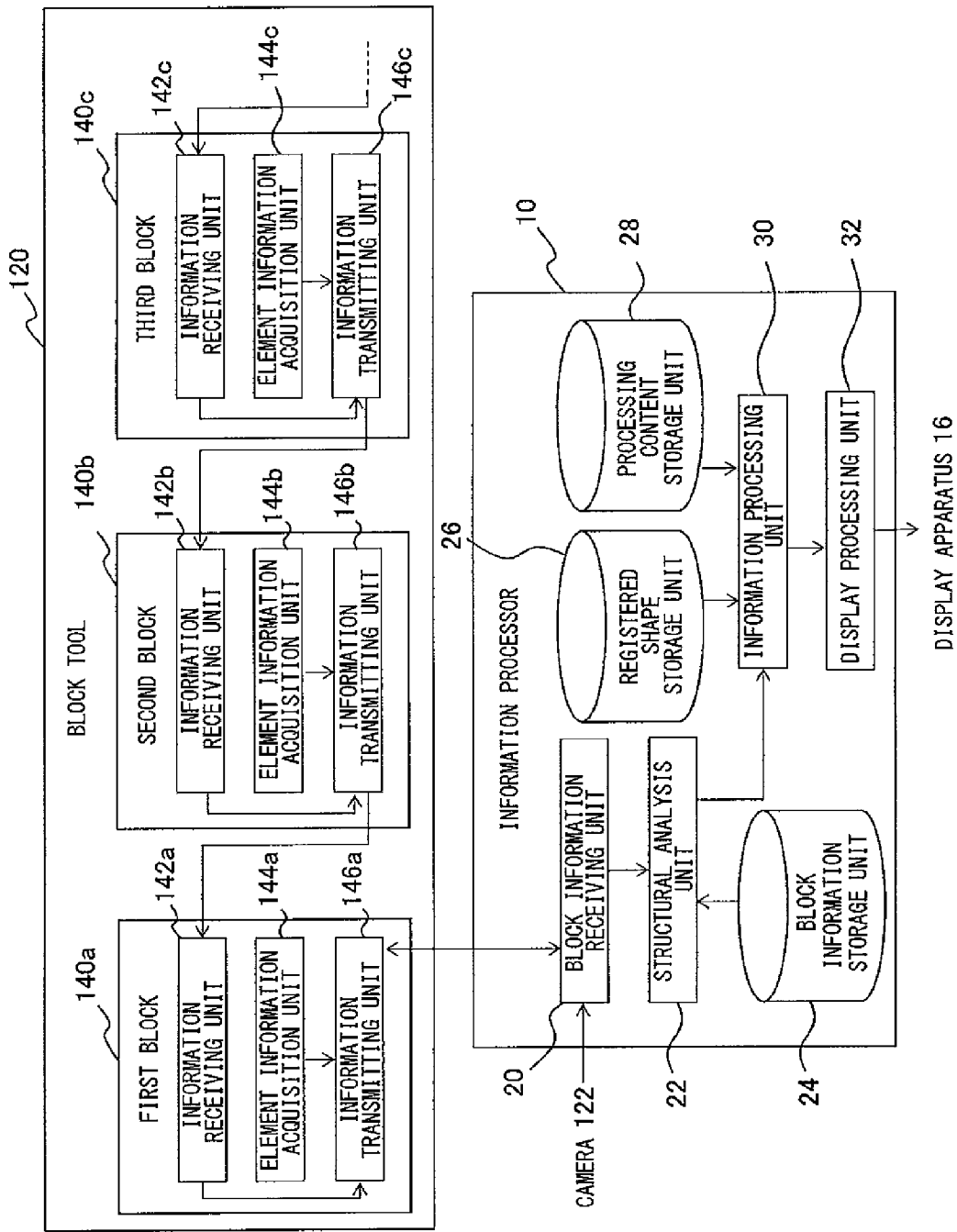
FIG. 6 is a diagram that shows detailed configurations of a block tool and an information processor in the present embodiment.

FIG. 6 shows detailed configurations of the block tool 120 and the information processor 10. Each of the elements represented by functional blocks for performing various processes shown in FIG. 6 can be implemented by a central processing unit (CPU), a memory, an LSI or the like in terms of hardware, and by a memory-loaded program from a recording medium or the like in terms of software. Also, as mentioned previously, each block of the block tool 120 is configured with a communication mechanism, a memory, or various sensors. Accordingly, it will be obvious to those skilled in the art that these functional blocks may be implemented in a variety of forms by hardware only, software only, or a combination thereof, and the form is not limited to any of them.

The block tool 120 is assembled by a user using blocks, as described above. In FIG. 6, each block is defined as a first block 140a, a second block 140b, a third block 140c, and so on. The first block 140a is a block having a mechanism to communicate with the information processor 10. In order to prevent complication of information, only one block among the blocks constituting the block tool 120 basically establishes communication with the information processor 10. Therefore, the first block 140a is given the role of a hub. Namely, a block more distantly connected to the first block 140a transmits information first, and the whole information on the block tool 120 will be gathered in the first block 140a.

Hereinafter, a block relatively closer to the first block 140a in the connected blocks is defined to be "upper", and a block relatively farther from the first block 140a is defined to be "lower". A block to be the first block 140a may be fixed to one block in advance, or each block having a mechanism to communicate with the information processor 10 may be provided with a switch or the like, which is not shown in the figures, and a block that has been switched on by a user may be set to the first block 140a. Alternatively, a block that first establishes communication with the information processor 10 at the stage of assembly may be determined as the first block 140a.

When a user connects another block to the first block 140a thus determined, the another block is defined as the second block 140b. If yet another block is connected to the second block 140b, the block will be the third block 140c. Although only three blocks are shown in FIG. 6, the number of connected blocks is not limited, as described above, and the same configurations and operations also apply to the case where only one block is used or where four or more blocks are used.

The first block 140a, second block 140b, and third block 140c include information receiving units 142a, 142b, and 142c, element information acquisition units 144a, 144b, and 144c, and information transmitting units 146a, 146b, and 146c, respectively. Each of the information receiving units 142a, 142b, and 142c receives information transmitted from the lower directly-connected block. The information to be received includes the identification number of a block connected lower than the relevant block, the identification number of a connecting part, and a measurement of an embedded sensor. When multiple blocks are connected, information is accumulated each time the information, which has been first transmitted by the lowest block, is passed through a block.

Each of the element information acquisition units 144a, 144b, and 144c includes a sensor embedded in the relevant block or a terminal provided at a part to which another block is connected, so as to acquire information on a measurement of the sensor or on a part to which a lower block is connected. The information transmitting units 146a, 146b, and 146c respectively add the information acquired by the element information acquisition units 144a, 144b, and 144c to the information received by the information receiving units 142a, 142b, and 142c including the identification number, the identification number of a connecting part, and a measurement of an embedded sensor of a lower block, and each of the information transmitting units transmits the resulting information as a signal to the upper directly-connected block. The information transmitting unit 146*a* in the first block 140*a* transmits such information to the information processor 10. The information transmitting unit 146*a* also functions as an interface for the information processor 10 and receives from the information processor 10 a signal for requesting the start or stop of processing or various signals required to establish communication.

The information processor 10 comprises: a block information receiving unit 20 that receives a signal and image data from the block tool 120 and the camera 122 respectively; a structural analysis unit 22 that identifies the shape and position of the block tool 120 based on received information; an information processing unit 30 that performs predetermined information processing based on the shape and position of the block tool 120 or according to a user's instruction; and a display processing unit 32 that generates an image to be displayed as a result of information processing and outputs the image to the display apparatus 16. The information processor 10 further comprises: a block information storage unit 24 in which the identification number of each block is related to the shape and the like of the block; a registered shape storage unit 26 in which a shape of the block tool 120 is related to information on an object model to be displayed; and a processing content storage unit 28 in which a shape, posture, position, and motion of the block tool 120 are related to a processing content to be performed.

The block information receiving unit 20 receives a signal including information on the identification number of a connected block, a connecting part of the block, and a measurement of an embedded sensor, which has been gathered in the first block 140*a* of the block tool 120. The block information receiving unit 20 also receives from the camera 122 the data of a captured image of the block tool 120. Since such a signal from the block tool 120 and image data from the camera 122 are instantly input, it is assumed that there is temporal correspondence therebetween; however, depending on the required temporal resolution, synchronization processing or the like may be performed.

The structural analysis unit 22 identifies the position, posture, and shape of the block tool 120 based on information acquired by the block information receiving unit 20 and with reference to the block information storage unit 24. In the block information storage unit 24, a table that relates the identification number of each block to the shape, size, and connecting part information is stored in advance. The connecting part information is information in which the identification number of a part to which another block can be connected is related to information on the position of the part.

The structural analysis unit 22 derives information of L1-L5 in FIG. 2 based on the identification numbers of all the blocks constituting the block tool 120. Also, based on the identification number of an actual connecting part and information from an angle sensor, the structural analysis unit 22 identifies an angle between blocks and a connecting position. The structural analysis unit 22 further derives the vector m1 in FIG. 2 based on information from a motion sensor and derives the position coordinates of a marker {(x1, y1, z1) in FIG. 2} based on image data provided by the camera 122. The structural analysis unit 22 then identifies the position, posture, and shape of the block tool 120 in a three-dimensional space, similarly to the central axis 124 shown in FIG. 3.

The information processing unit 30 performs necessary processing according to the shape, position, and posture of the block tool 120. For example, when the block tool 120 is assembled into a certain shape, an object model corresponding thereto is displayed. The displayed object is then made to move according to the motion of the block tool 120. Alternatively, a certain motion may be interpreted as a command, and the game may be advanced or the display content may be changed accordingly. Therefore, in the registered shape storage unit 26, information on a shape of the block tool 120 and image data of an object model to be displayed related to each other are stored in advance. Also, in the processing content storage unit 28, information on a motion of the block tool, i.e., a time variation of the shape and processing to be performed related to each other is stored.

Since the absolute position and posture of a block tool can be recognized in the present embodiment, conditions for applying an object model or for generating a command may be determined using not only the shape of the block tool but also the position and posture of the block tool in combination. In such a case, even with a block tool of the same shape, an object model can be changed or certain processing can be started only when the block tool is placed at a certain position or the block tool makes a certain posture, for example.

Alternatively, a user may register a shape of the block tool 120. In this case, the information processing unit 30 stores shape information of the block tool 120 acquired by the structural analysis unit 22 and identification information, in the registered shape storage unit 26, at a time when the user gives a registration instruction. In a similar way, a time variation of the shape of the block tool 120 given by the user and processing to be performed selected by the user may be related to each other and stored in the processing content storage unit 28. Since the block tool 120 of the present embodiment can also be considered as an input apparatus that is arbitrarily deformable, the block tool 120 can be used as a substitute for a conventional input apparatus such as a mouse. As a result, the range of processing performed by the information processing unit 30 is not limited. Also in such a case, a shape, position, and posture of the block tool may be registered in combination.

The display processing unit 32 generates image data as a result of processing performed by the information processing unit 30 and displays the image on the display apparatus 16. In the example in which an object that moves according to the motion of the block tool 120 is displayed, the object model is rendered at an output frame rate of the display apparatus 16 in accordance with the shape of the central axis of the block tool 120 at each time, and the rendered images are output as video signals to the display apparatus 16. To the rendering process, general computer graphics techniques can be applied.

Figures 7, 8:
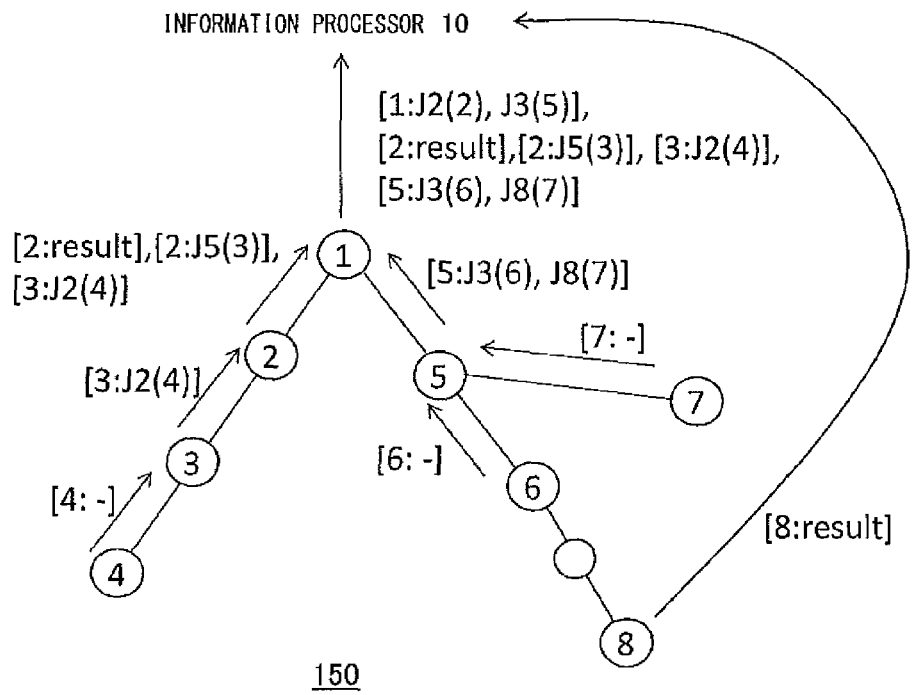
FIG. 7 is a diagram that schematically shows an example of information transmission paths and pieces of information transmitted in a block tool according to the present embodiment.
FIG. 8 is a diagram that shows an illustrative configuration of data stored in a block information storage unit of an information processor according to the present embodiment.

FIG. 7 schematically shows an example of information transmission paths and pieces of information transmitted in the block tool 120. In the information transmission paths 150, a circle in which a number is shown represents each block, and a line between circles represents the state of the relevant blocks being connected to each other. Also, the number in a circle is the identification number of each block. The block having the identification number "1" corresponds to the first block 140*a* in FIG. 6 and establishes communication with the information processor 10. Also, since the blocks having the identification numbers "2" and "3" are connected in series to the block with the identification number "1" in FIG. 7, it can be considered that the blocks correspond to the second block 140*b* and third block 140*c* in FIG. 6, respectively.

Meanwhile, multiple blocks may be connected to a single block. In the example of FIG. 7, the blocks with the identification numbers "2" and "5" are connected to the block with the identification number "1". To the block with the identification number "2" are connected the blocks with the identification numbers "3" and "4" in series in this order. To the block with the identification number "5" are connected the blocks with the identification numbers "6" and "7" in parallel. In this example, to the block with the identification number "6" is connected a block with no identification number, to which the block with the identification number "8" is further connected. The block with no identification number corresponds to a block having no mechanism therein, such as the block 126e in FIG. 5.

As described previously, information is basically transmitted from a lower block to an upper block. In FIG. 7, the content of transmitted information is shown together with an arrow that denotes the direction of transmission. For example, the information transmitted from the block with the identification number "3" to the block with the identification number "2" is shown as [3:J2(4)]. This is a signal expressed in the format of [the identification number of the block: the identification number of a connecting part provided in the block (the identification number of a block connected to the connecting part)], and the information indicates that the block with the identification number "4" is connected to the part with the identification number "J2" among the connecting parts provided in the block with the identification number "3". However, the format or content of information is not limited to that shown in FIG. 7.

The direction to the upper side of a block can be determined if a block functioning as a hub searches the network constructed by the connections of blocks and performs ranking or the like. In such a procedure, networking techniques for a device tree constituting a general information processing system can be adopted.

In FIG. 7, since the block with the identification number "4" is at the lowest position in the connected line to which the block belongs, the block transmits information to the immediate upper block with the identification number "3". If the block with the identification number "4" is not connected to any other block and the only connecting part can be identified, and if no sensor is embedded in the block, information to be transmitted will only be the identification number "4" of the block itself, so that the information is shown as "[4:-]". The denotation "-" indicates that there is no measurement of a sensor or no block connected to the relevant block.

When receiving a signal from the block with the identification number "4", the block with the identification number "3" relates, to the received information, the number of the terminal via which the block has received the signal, for example, as the identification number of the connecting part and also relates the identification number "3" of the block itself thereto, so as to transmit the resulting signal to the immediate upper block with the identification number "2". The transmitted information of the resulting signal is shown as [3:J2(4)], as described previously. In the same way, the block with the identification number "2" also generates a signal in which the identification number of the block itself, the identification number of the connecting part ("J5" in the example of FIG. 7), and the identification number "3" of the connected block are related, i.e., [2:J5(3)]. When the block with the identification number "2" includes a sensor therein, the block also generates a signal in which a measurement of the sensor and the identification number of the block itself are related to each other. Although the measurement is shown as "result" in the example of FIG. 7, a specific numerical value will be actually assigned thereto according to the type of the sensor.

The block with the identification number "2" transmits, to the immediate upper block with the identification number "1", the data thus generated and the data transmitted from the lower block, i.e., [3:J2(4)]. These signals may not necessarily be always transmitted simultaneously, and, when there is a change in the content of a signal that has been once transmitted, only the information of the change may be transmitted, for example. Meanwhile, if no sensor is embedded in each of the blocks with the identification numbers "6" and "7", which are connected to the block with the identification number "5", and if the only connecting part can be identified in each block, the blocks transmit the signals of [6:-] and [7:-], respectively, to the block with the identification number "5", as with the block with the identification number "4". Although another block is further connected to the block with the identification number "6", the another block does not have an identification number or a communication mechanism, so that any information cannot be obtained therefrom.

The block with the identification number "5" generates a signal in which the identification number of the block itself is related to the identification number of a connecting part and the identification number of a block connected to the connecting part and transmits the signal to the immediate upper block with the identification number "1". When multiple blocks are connected as shown in FIG. 7, the information is correctively described as [5:J3(6), J8(7)] or the like. The "J3" and "J8" in the information are the identification numbers of the connecting parts to which the blocks with the identification numbers shown in the parentheses are connected.

Thus, the whole information on the block tool 120 is gathered in the block with the identification number "1". As with the other blocks, the block with the identification number "1" also generates a signal in which the identification number of the block itself is related to the identification number of a connecting part and the identification number of a block connected to the connecting part. The block then transmits the signal thus generated and the signals transmitted from the lower blocks to the information processor 10. Accordingly, the information processor 10 can sequentially acquire the identification numbers of blocks constituting the block tool 120, the connection relationships among the blocks, and a measurement in a block in which a sensor is embedded.

In this way, if one block is determined as a block functioning as a hub and information is gathered in the block so as to be transmitted to the information processor 10, complication of information or unnecessary communication processing can be prevented. In some cases, communications with the information processor 10 may be performed by multiple blocks. In the example of FIG. 7, the block with the identification number "8" is connected to the block with the identification number "6" via a block with no communication mechanism.

In such a case, the block with the identification number "8" may transmit its own data directly to the information processor 10. For example, if the block includes a position sensor and transmits the identification number of the block itself and a measurement directly to the information processor 10, the information processor 10 can find that there is a block connected lower than the block with the identification number "6" and can estimate the shape and the approximate connection condition of the block. The same applies to the case where position information is acquired in cooperation with the camera 122. If more sensors are embedded in the block with the identification number "8", the accuracy of the information will be improved. With such a configuration, a block with no communication mechanism can be connected, so that variations in the shape can be increased without increase in costs. Also, by a combination of multiple blocks capable of acquiring position information, if a marker used for position information is hidden from the camera's view, another block marker, which is not hidden, can be used, so that reliable information can be obtained.

If the block with the identification number "8" does not have a mechanism to communicate with the information processor 10, the block will wait until another block having a mechanism to communicate with the information processor 10 is directly or indirectly connected thereto. When such another block is connected, the direction toward the another block is defined as "upper" and the block with the identification number "8" transmits a necessary signal to the another block, so that information gathered in the another block will be transmitted to the information processor 10 through a path different from that from the block with the identification number "1", in the same way as stated previously.

FIG. 8 shows an illustrative configuration of data stored in the block information storage unit 24 of the information processor 10. A block information table 160 contains an identification number field 162, a shape field 164, a size field 166, and a connecting part field 168. The identification number field 162 describes an identification number assigned to each of blocks constituting a block tool. The shape field 164 describes the type of the shape of each block, i.e. a block form as exemplified in FIG. 1, such as "square pillar" and "cube". The size field 166 describes the width, depth, and height of each block.

The connecting part field 168 describes a position of each connecting part provided in each block and the identification number related thereto. In the example of FIG. 8, a connecting part is described in the format of "the identification number of the connecting part (the face number, the x-coordinate on the face, the y-coordinate on the face)". The face number is uniquely determined for each face of a block in advance. For example, the block with the identification number "1" is a square-pillar block measuring 4 centimeters in width, 4 centimeters in depth, and 8 centimeters in height. The connecting part with the identification number "J1" is positioned at the coordinates (2, 2) on the first face, and the connecting part with the identification number "J2" is positioned at the coordinates (1, 2) on the second face. However, the format is not limited to that shown therein.

Since such an information table is retained in the information processor 10, the parameters shown in FIG. 2 can be obtained based on a signal transmitted from the block tool 120. Consequently, the shape, position, and posture of the block tool 120 can be calculated as shown in FIG. 3.

Figure 9:
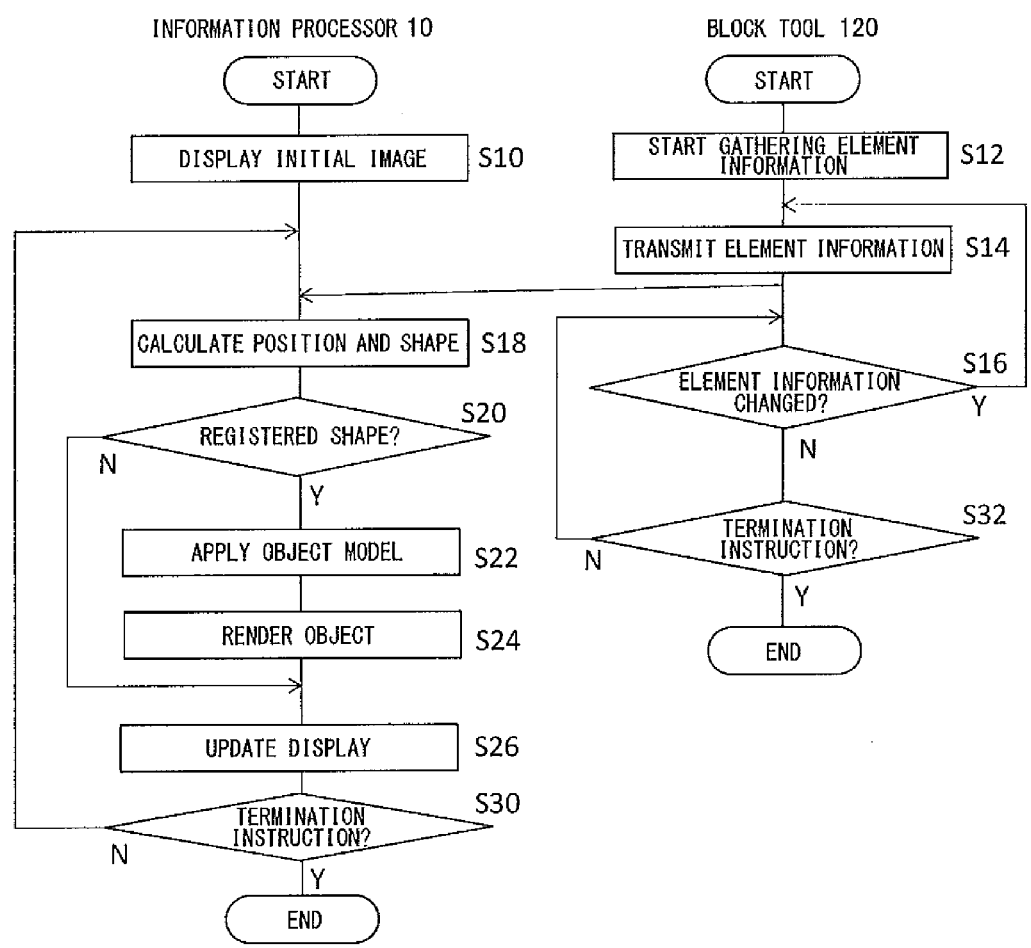
FIG. 9 is a flowchart that shows a procedure for performing information processing according to the assembly or motion of a block tool in the present embodiment.

Next, there will be described operations of an information processing system implemented by the aforementioned configurations. FIG. 9 is a flowchart that shows a procedure for performing information processing according to the assembly or motion of a block tool. As an example, FIG. 9 shows processing for displaying an object model that is provided according to the shape of a block tool and moves according to the motion of the block tool. This flowchart starts when a user turns on the information processor 10 and any block provided with a battery among the blocks of the block tool 120 and inputs an instruction for starting the process, such as selecting an application on the information processor 10. The information processor 10 includes a general input apparatus as a user interface through which an instruction necessary for starting or terminating a process or an instruction necessary for subsequent processing is input.

First, the information processing unit 30 and display processing unit 32 in the information processor 10 cooperatively display a predetermined initial image on the display apparatus 16 (S10). Meanwhile, the block tool 120 starts gathering element information, such as connected blocks, connecting parts, and measurements of sensors embedded in the blocks (S12). This process corresponds to the process of acquiring and gathering information described in FIG. 7. The information thus gathered is then transmitted as a signal from a block functioning as a hub to the information processor 10 (S14).

In the state where blocks are not assembled yet, blocks that are turned on and capable of communicating with the information processor 10 may respectively transmit a signal to the information processor 10, for example. At a time when such a block is directly or indirectly connected, any of such blocks is determined as a hub of the connected body. The gathering of element information and the transmission of the information to the information processor 10 will be constantly performed thereafter. Alternatively, such gathering and transmission is performed, as needed, when a block is connected or disconnected or when there is a change in the measurement of a sensor (Y at S16, S14).

When the block information receiving unit 20 in the information processor 10 receives transmitted information, the structural analysis unit 22 calculates the position, posture, and shape of the block tool 120 in a three-dimensional space based on the information (S18). Depending on subsequent processing, the width of the block tool 120 or the like may be derived from the size of each constituent block. The information processing unit 30 checks whether or not the shape of the block tool 120 at the time is registered with reference to the registered shape storage unit 26 (S20).

If the shape is registered (Y at S20), the data of an object model related to the shape is retrieved from the registered shape storage unit 26 and applied (S22). Thereafter, the object model is rendered so that the position, orientation, and posture of the object model correspond to the position, posture, and shape of the block tool 120 calculated at S18, and the display is updated (S24, S26). If the shape of the block tool 120 is not found in the registered shapes (N at S20), the display is updated by, for example, displaying an image of the block tool 120 captured by the camera 122 (S26). The figure of the central axis of the block tool 120, as shown in FIG. 3, may be displayed instead. Alternatively, in cases other than the case where the relevant shape is registered and an object can be applied, the initial image may be continuously displayed.

If there is a change in element information, the block tool 120 will notify the information processor 10 thereof (Y at S16, S14), and, if there is no change, the block tool 120 will be prepared for transmission processing while gathering information (N at S16, N at S32). When a user's input for terminating the processing, such as turning off the blocks, is detected, the whole processing is terminated (Y at S32). In the information processor 10, the display is occasionally updated based on information from the block tool 120 until the user inputs an instruction for terminating the processing (N at S30, S18-S26) and, when such an instruction is input, the processing is terminated (Y at S30). The block tool 120 may also terminate its own processing upon receiving from the information processor 10 a notification of termination of processing.

Figure 10:
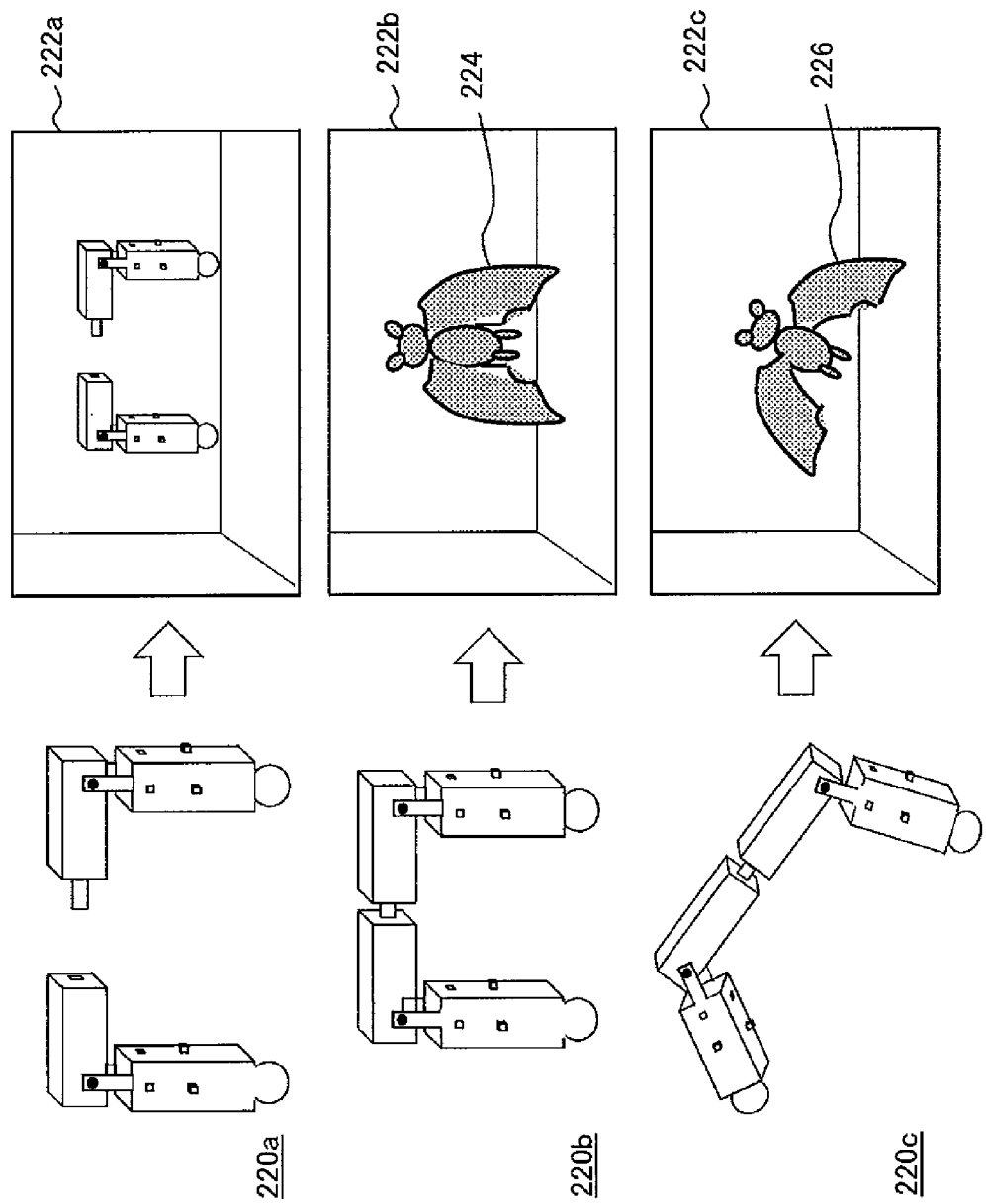
FIG. 10 is a diagram that shows an example of transitions of a block tool and a display screen in the present embodiment.

FIG. 10 shows an example of transitions of a block tool and a display screen. The left column shows the states of an actual block tool, and the right column shows illustrative screens displayed on the display apparatus 16 in the respective states. The block tool 220a in the first state is formed by two L-shaped block tools, in each of which two square-pillar blocks arranged one above the other make a right angle. The angle made by the upper and lower blocks in each block tool is variable, and the angle is measured by an angle sensor.

When such an L shape is not registered in the registered shape storage unit 26, a captured image of the block tool 220a is displayed as it is on the display screen 222a at the time. If a virtual world is set to the background in a game or the like, no object for the block tool 220a may be displayed at the time. Alternatively, two marks indicating that two block tools are recognized may be simply displayed.

Next, in the block tool 220b in the second state, the two block tools in the block tool 220a in the first state are connected to each other, making an arch-like connected body. If such a shape is registered in the registered shape storage unit 26 and related to an object model of a bat therein, a bat object 224 will appear within the screen at the time when the arch-like block tool 220b is assembled (the display screen 222b). In the rendering position, the position coordinates calculated as the position of the block tool 220b will be reflected. For example, when a three-dimensional space in the camera coordinate system of the camera 122 is projected on the screen coordinates, the position coordinates of the block tool may be initially calculated in the camera coordinate system, or coordinate transformation may be performed so as to calculate the position coordinates in the camera coordinate system.

In the block tool 220c in the third state, the whole block tool 220b in the second state is given an inclination, and the lower blocks are moved outward so that the angle between the upper and lower blocks in each block tool becomes larger. It is assumed here that the user holds the lower blocks in both hands and moves the block tool (the illustration of the hands is omitted). The bat object that has appeared on the display screen 222b then inclines so as to correspond to the state of the block tool 220c and appears as a bat 226 with spread out wings (the display screen 222c).

When the camera 122 is placed so as to face the user, as shown in FIG. 4, an image as shown on the display screen 222c can be displayed by performing a reflection, by which an image is horizontally reversed. Whether to perform a reflection is determined according to the position of the camera 122 or the content to be displayed. By displaying such a screen as the display screen 222c in real time according to the motion of the block tool, a bat flying or perching on an object in a virtual world can be displayed intuitively and easily through the operation of the block tool.

If the background within a screen is set to a real world captured by the camera 122, augmented reality (AR), in which a virtual object is incorporated into a real world, can be implemented. In this case, if the camera 122 is attached to the user, the images of blocks being assembled and changed into an object captured from the user's viewpoint can also be displayed. When AR is implemented using blocks, since the real blocks form a virtual object, the interaction between the virtual object and an object in the real world can be expressed within the display screen. For example, when a book on the desk is pushed over by the block tool, a virtual object within the screen moves in the same way, so that the real book on the desk being pushed over can also be displayed.

Figure 11:
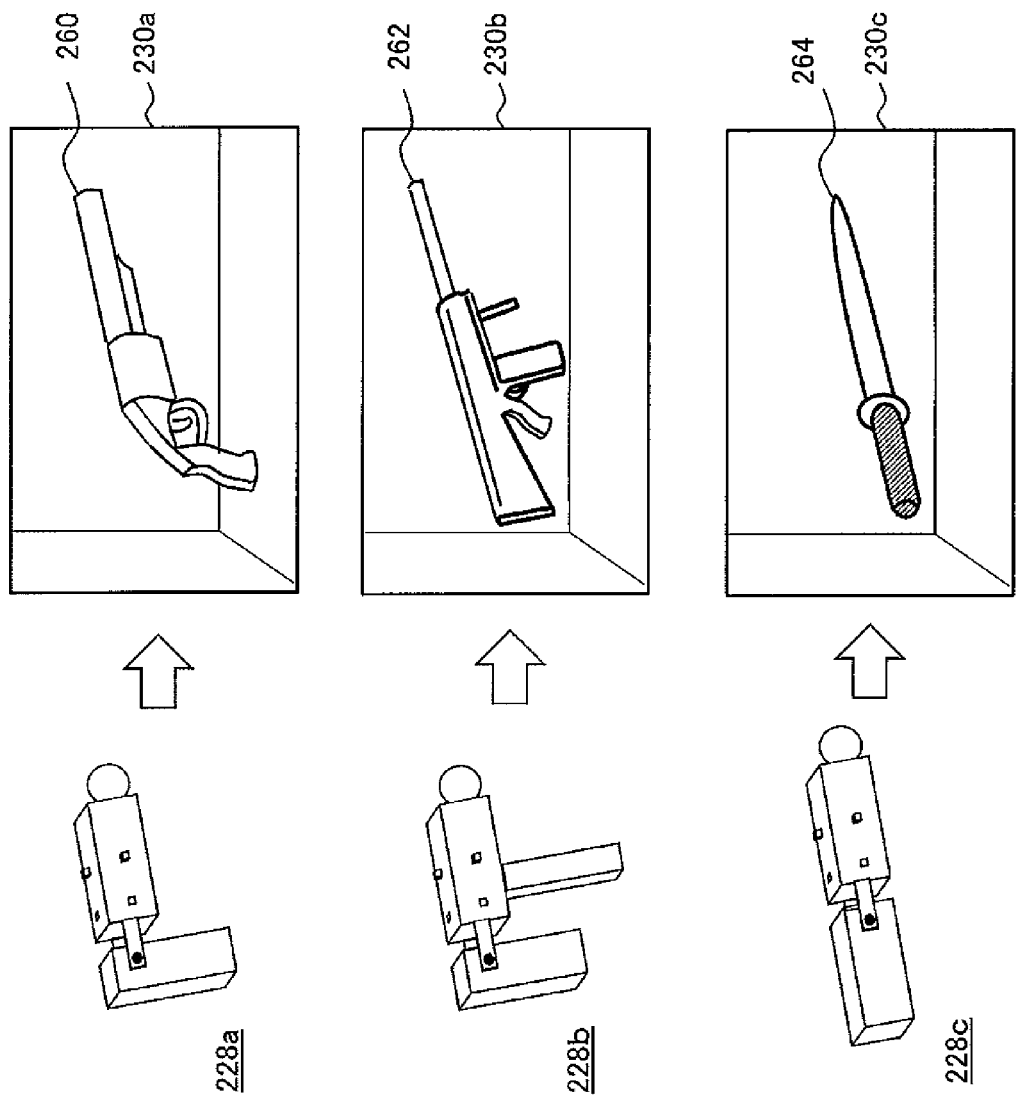
FIG. 11 is a diagram that shows another example of transitions of a block tool and a display screen in the present embodiment.

FIG. 11 shows another example of transitions of a block tool and a display screen. The way of illustrating is the same as shown in FIG. 10. The block tool 228a in the first state is formed by an L-shaped block tool, in which two square-pillar blocks arranged one above the other make a right angle. The angle made by the upper and lower blocks is variable, and the angle is measured by an angle sensor. If such an L shape is registered in the registered shape storage unit 26 and related to an object model of a pistol therein, a pistol 260 will be displayed on the screen as shown on the display screen 230a.

As with the case of FIG. 10, if a user holds and moves the lower block of the block tool 228a, the direction or position of the pistol 260 on the display screen 230a can be changed. Although only the pistol 260 appears within the display screen 230a, if the technique of operating a character within the screen according to the motion of the user's body is used together, a game in which the character fights against an enemy with the pistol 260 as a weapon can be implemented, for example.

In the block tool 228b in the second state, another square-pillar block is connected to the upper block of the block tool 228a in the first state so as to extend downward. If such a shape is registered besides the shape of the block tool 228a in the first state and related to an object model of a machine gun, the object within the screen will change from the pistol 260 to a machine gun 262 at the time when the another block is connected (the display screen 230b). Conversely, if the another block is detached and the block tool is returned to the block tool 228a in the first state, the object within the screen will also return from the machine gun 262 to the pistol 260 (the display screen 230a).

In the block tool 228c in the third state, the bend angle made by the two blocks in the block tool 228a in the first state, i.e., the right angle, is eliminated, so that the block tool forms a straight rod-like shape. If such a shape is registered besides the shape of the block tool 228a in the first state and related to an object model of a sword, the object within the screen will change from the pistol 260 to a sword 264 at the time when the bend angle is eliminated (the display screen 230c).

With such configurations, even if the content is the same, variations can be provided in the object model within the screen operated by a user by changing the shape of the block tool. Also, using the characteristic of the variable shape of the block tool, if a registered shape of the block tool is made closer to the shape of an object model related thereto, the situation can be made more realistic and intuitive operation is enabled. Further, by providing an embodiment in which the addition of more blocks can cause emergence of a more powerful weapon or a more attractive character in a virtual world, the collection or assembly of the blocks can also be made amusing.

Although the figure shows the example in which the object model itself is changed according to attachment or detachment of a block or a change of the shape, the operation or performance of the object model may be changed while the object model remains unchanged. For example, when the block tool 228a in the first state is changed to the block tool 228b in the second state, the object model may be the same pistol but the power thereof or the probability of hitting an enemy thereof may be increased. In this case, a shape of a block tool and a program to be invoked to change the operation or performance of an object model are related to each other and registered in the processing content storage unit 28 of the information processor 10.

Figure 12:
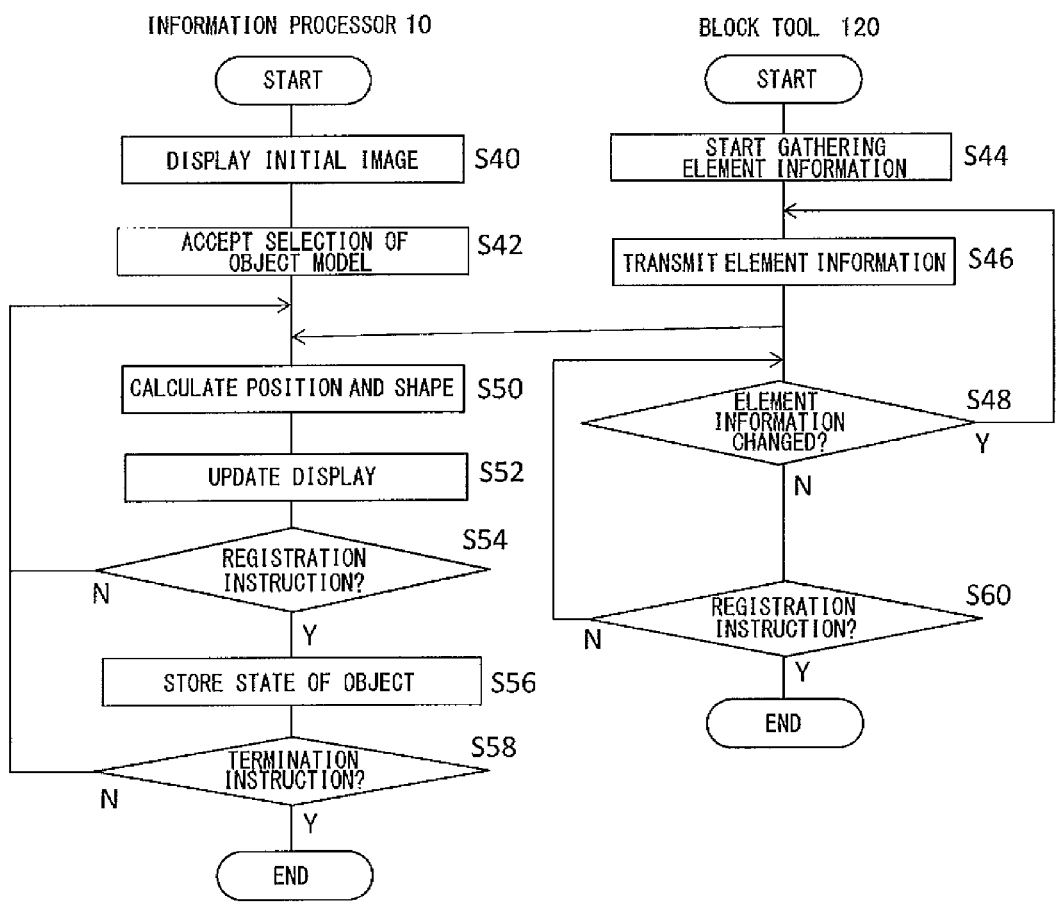
FIG. 12 is a flowchart that shows a procedure for creating a shape or motion of an object using a block tool in the present embodiment.

There has been mainly described an illustrative embodiment in which an object, which has been related to a block tool in advance, changes or moves in real time according to the shape or motion of the block tool. Meanwhile, another embodiment can be considered in which a user registers a shape or motion of an object using a block tool. FIG. 12 is a flowchart that shows a procedure for creating a shape or motion of an object using a block tool. The state in which the flowchart starts or the procedure in the block tool 120 is the same as shown in FIG. 9. In the following, description will be given with emphasis on the differences from the procedure shown in FIG. 9.

First, an initial image is displayed by the information processor 10 (S40). The screen displayed here may be a real-time image of the block tool captured by the camera 122, for example. Meanwhile, the block tool 120 starts gathering element information and transmits the information thus gathered to the information processor 10 (S44, S46). During that time, the information processing unit 30 in the information processor 10 accepts from a user a selection of an object model to be registered (S42). For example, a list of images of candidate object models may be displayed on the display apparatus 16 so that a user can select an object model therefrom.

When the user moves the image of the selected model onto a real-time image of a block tool to be related thereto by a drag-and-drop operation, the image of the model and the block tool are related to each other. If the block tool 120 is already assembled into the shape of a human being or the like, the user may select an image of a desired character from the image list and relate the image to the block tool. The face or costume of the character may be made individually selectable.

When the information processor 10 receives information transmitted from the block tool 120, the structural analysis unit 22 calculates the position, posture, and shape of the block tool 120 in a three-dimensional space based on the information (S50). The information processing unit 30 then applies the object model selected by the user at S42 and renders an object in which the position, posture, and shape of the block tool 120 are reflected, so as to update the display (S52). Before a selection of an object model is received at S42, the calculation results of the position, posture, and shape of the block tool 120 may be once displayed as a figure, such as the central axis as shown in FIG. 3. The user may then fit the image of the selected object model on the figure in the process of S42.

If the user changes the shape, position, and orientation of the block tool 120 in various ways, the information thereof will be sequentially transmitted from the block tool 120 to the information processor 10 (Y at S48, S46). Consequently, the position or posture of the object displayed by the information processor 10 will also be changed so that the information is reflected therein (N at S54, S50, S52). If the user inputs a registration instruction to the information processor 10 (Y at S54), the information processing unit 30 will store the state of the displayed object at the time in the registered shape storage unit 26 (S56).

For example, an identification number representing the order of registration and the identification number, a posture, and a position of an object model may be related to each other and registered together. Alternatively, a shape or a position of the original block tool 120 may be stored. By repeating the processing of S50 through S56 for each output frame, content including animation in which an object moves in the order of registration can be created. Also, by relating a state of an object to a command selected from a command list prepared previously and registering them in the processing content storage unit 28, content in which certain information processing is started depending on the state of the block tool can be created.

The updating of the display or the registration is repeated based on information from the block tool 120 until the user inputs an instruction for terminating the processing (N at S58, S50-S56) and, when such an instruction is input, the processing is terminated (Y at S58). If there is no change in element information, the block tool 120 will be prepared for transmission processing while gathering information (N at S48, N at S60), and, when a user's input for terminating the processing, such as turning off the blocks, is detected, the whole processing will be terminated (Y at S60).

Figure 13:
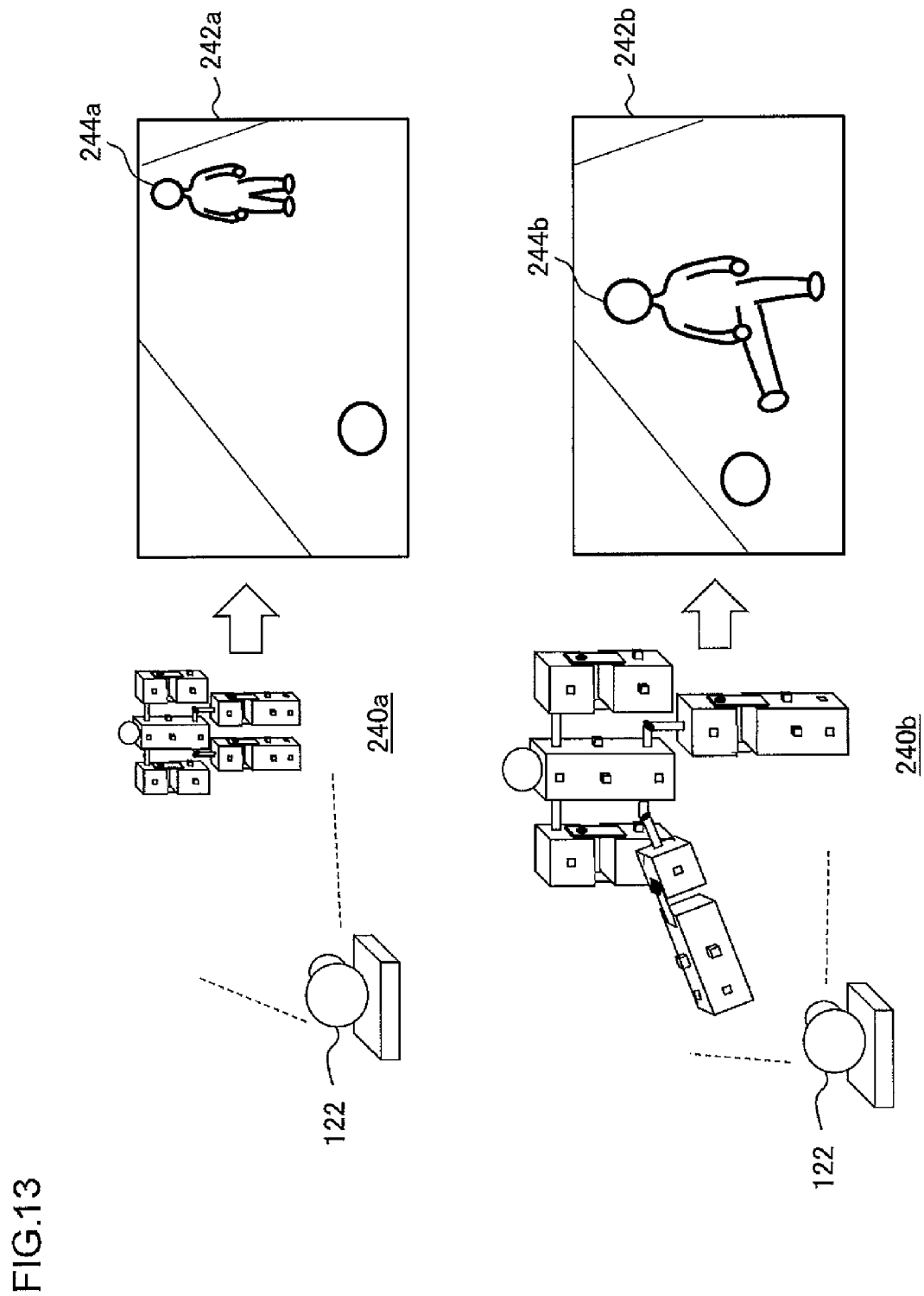
FIG. 13 is a diagram that shows an example of transitions of a block tool with which a state of an object is registered and a screen displayed using the block tool in the present embodiment.

FIG. 13 shows an example of transitions of a block tool with which a state of an object is registered to be used later and a screen displayed using the registered information. The block tool 240a in the first state is formed by multiple blocks assembled into the shape of a human being. After assembling the blocks as such, the user places the blocks at a desired position within the field of view of the camera 122. Meanwhile, the user selects an image of a human being as an object model, and a human object is displayed on the display apparatus 16 accordingly.

Since a position of a block tool in a three-dimensional space can also be recognized in the present embodiment, if the field of view of the camera coincides with the display screen, an object will appear on the display screen similarly to the block tool viewed from the camera. Since only an object to be registered is displayed at the time of registration, only a human object 244a among the objects within the display screen 242a shown in FIG. 13 is displayed on the display apparatus 16 at this point. When the user inputs a registration instruction to the information processor 10, the image of the object model and the position, posture, and orientation of the object in a three-dimensional space are stored in the registered shape storage unit 26.

Subsequently, if the user repetitively provides registration instructions while bringing the block tool closer to the camera 122, the object coming closer within the screen will be recorded. The block tool 240b in the second state embodies the state after the block tool is gradually brought closer to the camera 122, in which the block representing the right leg of the object is raised. At the time, among the objects within the display screen 242b shown in FIG. 13, only a human object 244b raising the right leg is displayed on the display apparatus 16. If the user then inputs a registration instruction, the state of the object will be stored.

Such a position or posture of an object thus stored can be used later to display animation. For example, by combining such animation with another animation featuring a ball created separately, a person running from a distance and kicking a ball up can be displayed, as with progressing from the display screen 242a to the display screen 242b. Also, if a user provides a certain instruction input in a game or the like providing a virtual world and registered data is retrieved accordingly, a position or a motion can be reproduced. For example, in a scene where a character fights against an enemy, a user can try out an own-devised technique.

Although the example of FIG. 13 shows an embodiment in which an object within a screen moves in a manner as registered by a user, the block tool itself can also be manipulated as a robot in a similar way. In this case, an actuator is provided in a joint part at which the angle is variable in the block tool, and the actuator is made controllable via wireless communication from the information processor 10. In such condition, multiple successive states of the block tool are sequentially registered in the same way as in the example of FIG. 13. At the time of reproduction, by controlling the actuator so as to reproduce the states of the block tool in the order of registration, a desired motion can be reproduced with the actual block tool. Such an embodiment is considered to be applicable to a robot game in which each block tool is recognized using infrared light or the like and made to salute or fight using a devised technique.

Figure 14:
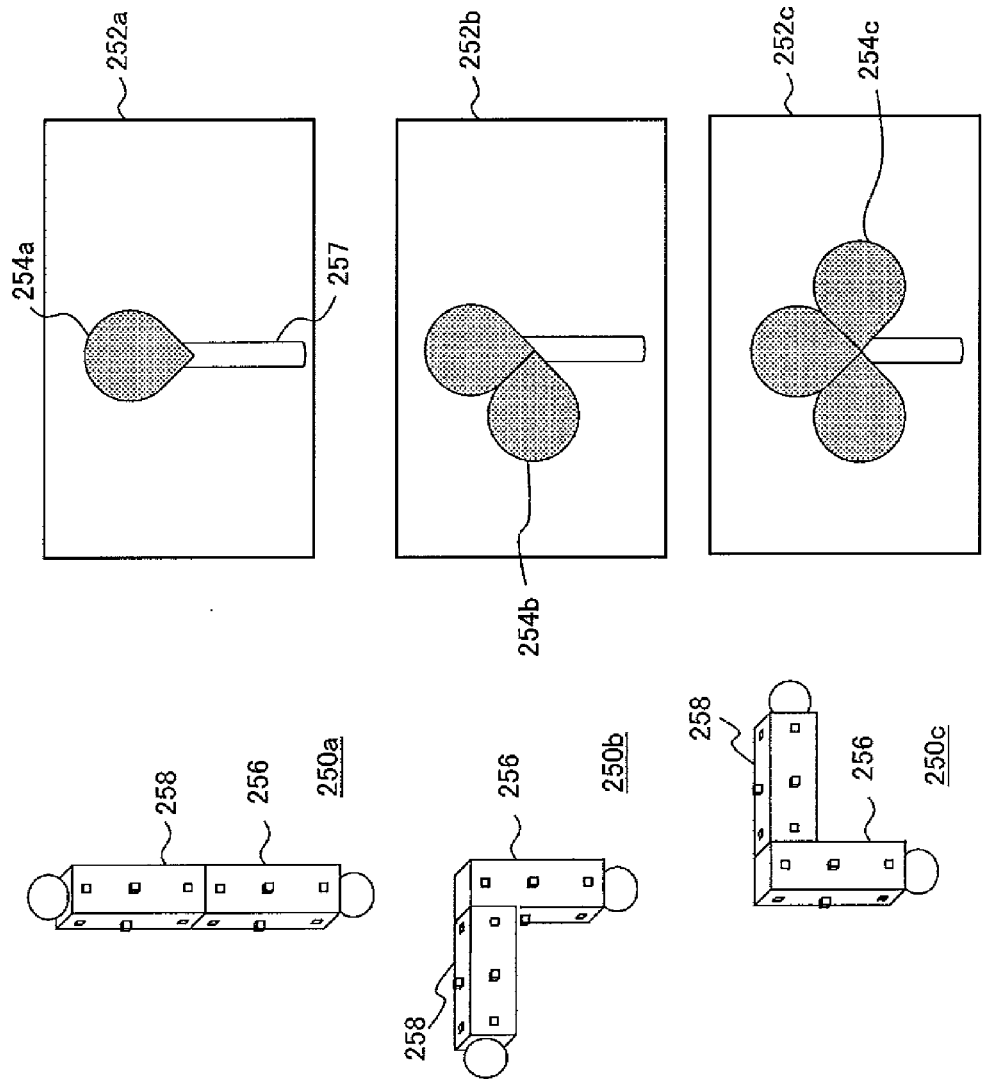
FIG. 14 is a diagram that shows an example of transitions of a block tool with which an object is created using two blocks and a screen displayed upon registration in the present embodiment.

In this way, by applying the embodiment in which a user registers a state of a block tool, various objects can be created with fewer blocks. FIG. 14 shows an example of transitions of a block tool with which an object is created using two blocks and a screen displayed upon registration. In the block tool 250a in the first state, two square-pillar blocks are connected vertically. The lower block of the two blocks is set to be a reference block 256 in advance. The structural analysis unit 22 in the information processor 10 identifies the connection condition and positions of the two blocks in the block tool 250a in the first state.

For the two blocks displayed on the display apparatus 16, a user relates a stalk model to the reference block and relates a petal model to the upper block 258. Accordingly, a stalk 257 and a petal 254a are displayed on the display apparatus 16 at positions corresponding to the positions of the respective blocks, as shown on the display screen 252a. At this point, the user inputs a registration instruction. The information processing unit 30 then relates an object model of a stalk with a single petal (referred to as the first state model) to the state of the block tool with only the reference block 256 and stores the relationship in the registered shape storage unit 26. The information processing unit 30 also stores the information that the reference block 256 corresponds to the stalk of the object model.

In the block tool 250b in the second state, the upper block 258 has been once detached and reconnected to the reference block 256 at the top on the left side. The structural analysis unit 22 then discovers the upper block 258 being connected to another part of the reference block 256. Accordingly, the first state model is retrieved, and the user is prompted to relate an object model to a block other than the reference block to which a stalk is related, i.e., the upper block 258 of which the connecting position has been changed.

If the user relates a model of a single petal to the upper block 258, there will be displayed an object model in which another petal 254b is provided at the position of the upper block 258 thus newly related thereto in addition to the first state model (the display screen 252b). When a registration instruction is input in this state, an object model of a stalk with two petals (referred to as the second state model) is stored and the first state model previously stored is overwritten therewith.

Next, in the block tool 250c in the third state, the upper block 258 has been detached again and reconnected to the reference block 256 at the top on the right side. As with the block tool 250b in the second state, if an object model of a petal is related to the reconnected upper block 258, there will be displayed an object model in which yet another petal 254c is provided at the position of the upper block 258 thus newly related thereto in addition to the second state model (the display screen 252c). When a registration instruction is input in this state, an object model of a stalk with three petals is stored and the second state model previously stored is overwritten therewith.

By repeating a similar process, a complicated object model of a user's desired shape can be generated using fewer blocks. In this embodiment, the registration process at each stage corresponds to defining, each time, the orientation relationship or positional relationship between a part of an object represented by the reference block and another part of the object represented by another block. As a result, even if a block is detached, the relationship between the reference block and the other parts will be kept. In the case shown in FIG. 14, for example, the positions of the three petals with respect to the stalk are fixed. Consequently, when performing display using the object, the complete object model can be operated according to the motion of the reference block.

Although the position or orientation of the reference block 256 is not changed in the example of FIG. 14, since the structural analysis unit 22 recognizes the reference block 256, registrations can be made in the same way even when the reference block 256 is moved and another block is reconnected thereto. For example, when it is preferable to connect another block tool from the right using the right hand, the another block tool may be always connected from the same direction while the reference block 256 is rotated, so that the connecting part can be changed in the same way as described above.

By expanding the above principle and with the linkage of orientation relationships or positional relationships between neighboring objects, the shape of the whole complete object can be defined, so that the reference block may not necessarily be one. As a result, a relatively large scale object such as a house or a town can also be easily designed using fewer blocks. Also, by not only gradually adding a module of an object, but also recording and gradually adding a time variation of the shape, orientation, and position of a block tool, multiple motions can be combined so as to complete one motion.

Although the above embodiment is an example of generating an object model within a screen, if a model designed in such a way is used as an input value for a three-dimensional printer, even a complicated model can be easily created as a real object.

According to the present embodiment described above, blocks having various shapes and sizes are used as an input apparatus for information processing. If a block provided with a marker for detecting a position in a three-dimensional space, a block provided with a motion sensor, and a block provided with an angle sensor is prepared, the position, posture, and shape of the assembled connected body in the three-dimensional space can be identified. With such a configuration, the restrictions on the shape or connecting means of each block can be reduced, so that a connected body desired by a user can be easily created and can be recognized by an information processor. Also, since the shape of a connected body is geometrically calculated, a block having no mechanism therein can also be connected, so that the variations of blocks can be increased and the manufacturing cost can be reduced.

Further, since a position in a three-dimensional space can be identified, the position of an object can also be defined in addition to the model of the object, so that a motion including a character's moving in a game or animation can be easily designed. If an object model is registered with respect to a state of blocks including relative positional relationships between multiple blocks, there can be provided amusement such that an object appears within a screen when the blocks get into the state and moves according to a motion of the blocks. In addition, if information on a relationship between a state of blocks and an object model is accumulated and registered, a complicated object model can be created with fewer blocks and can be manipulated.

The present invention has been described with reference to the embodiment. The embodiment above is intended to be illustrative only, and it will be obvious to those skilled in the art that various modifications to constituting elements or processes could be developed and that such modifications also fall within the scope of the present invention.

What is claimed is:
1. An input apparatus, comprising:
a plurality of blocks releasably connectable to each other and each block including at least one of:
a position acquisition unit provided with a mechanism to acquire an exact position in a three-dimensional space;
a connecting part identification unit configured to acquire a position to which another block is connected;
a sensor measurement acquisition unit configured to acquire a measurement of an embedded sensor;
an inclination identification unit configured to acquire an inclination;

an inter-block communication unit configured to transmit or receive signal to or from one or more of the plurality of blocks via a connecting part, where one or more of the plurality of blocks do not have an inter-block communication unit; and an information transmitting unit configured to transmit information acquired internally to an information processor that uses a signal from the input apparatus as an input value to perform information processing in accordance with the position, posture, and shape of the input apparatus, and the information transmitting unit is configured to transmit, to the information processor, pieces of information acquired within and transmitted from one or more of the plurality of blocks directly or indirectly connected to the block comprising the information transmitting unit, wherein any of the plurality of blocks that are provided with the inter-block communication unit and are connected to the one or more blocks that do not have the inter-block communication unit transmit internally-acquired information directly or indirectly to any of the plurality of blocks that have the information transmitting unit.

2. The input apparatus according to claim 1, wherein the plurality of blocks are connected to each other at a connection terminal used by the inter-block communication unit to establish communication between the blocks.

3. The input apparatus according to claim 1, wherein each of the plurality of blocks comprise a memory configured to store an identification number for identifying a size of the each of the plurality of blocks.

4. The input apparatus according to claims 1, wherein one or more of the plurality of blocks comprises, as the embedded sensor, a mechanism to create a bend angle and an angle acquisition unit configured to acquire the value of the bend angle.

5. An information processing system comprising:
an input apparatus configured with a plurality of blocks releasably connectable to each other; and
an information processor,
wherein each of the plurality of blocks includes at least one of:
a position acquisition unit provided with a mechanism to acquire an exact position in a three-dimensional space;
a connecting part identification unit configured to acquire a position to which another block is connected;
a sensor measurement acquisition unit configured to acquire a measurement of an embedded sensor;
an inclination identification unit configured to acquire an inclination;
an inter-block communication unit configured to transmit or receive signal to or from one or more of the plurality of blocks via a connecting part, where one or more of the plurality of blocks do not have an inter-block communication unit; and
an information transmitting unit configured to transmit information acquired internally to the information processor that uses a signal from the input apparatus as an input value to perform information processing in accordance with the position, posture, and shape of the input apparatus, and the information transmitting unit is configured to transmit, to the information processor, pieces of information acquired within and transmitted from one or more of the plurality of blocks directly or indirectly connected to the block comprising the information transmitting unit, wherein any of the plurality of blocks that are provided with the inter-block communication unit and are connected to the one or more blocks that do not have the inter-block communication unit transmit internally-acquired information directly or indirectly to any of the plurality of blocks that have the information transmitting unit, the information processor including:
a structural analysis unit configured to calculate a position, posture, and shape of the input apparatus in a three-dimensional space on the basis of information transmitted from the input apparatus; and
an information processing unit configured to perform information processing in accordance with a result calculated by the structural analysis unit.

6. The information processing system according to claim 5, wherein the information processing unit renders an object that moves in accordance with a motion of the input apparatus, at a position corresponding to the position of the input apparatus on an image acquired from a camera for shooting a real space within a field of view including the input apparatus.

7. The information processing system according to claim 5, wherein the information processing unit
sequentially stores in a storage apparatus a state of an object displayed in accordance with a position, posture, and shape of the input apparatus in a three-dimensional space, in accordance with a registration instruction input by a user and
displays, in accordance with a reproduction instruction, animation for reproducing the states of the object in the order of being stored in the storage apparatus.

8. The information processing system according to claim 5, wherein, in accordance with a registration instruction input by a user, the information processing unit stores in a storage apparatus an image of an object displayed in accordance with a position, posture, and shape of the input apparatus in a three-dimensional space, and
wherein, upon input of another registration instruction, the information processing unit adds, to the previously-stored image of the object, another object newly related to the difference from the previously-stored state of the input apparatus, thereby updating the image of the object stored in the storage apparatus.

9. The information processing system according to claim 5, wherein, when an analysis result from the structural analysis unit meets a condition registered in advance, the information processing unit renders an object related to the condition at a position within a display screen corresponding to the position of the input apparatus in a three-dimensional space.

10. The information processing system according to claim 9 wherein, when an analysis result from the structural analysis unit changes from the condition to another pre-registered condition, the information processing unit changes the object to render to an object related to the condition thus changed.

11. An information processor, comprising:
a block information receiving unit configured to receive information from an input apparatus, wherein the input apparatus includes a plurality of blocks releasably connectable to each other and each block including at least one of:
a position acquisition unit provided with a mechanism to acquire an exact position in a three-dimensional space;
a connecting part identification unit configured to acquire a position to which another block is connected;
a sensor measurement acquisition unit configured to acquire a measurement of an embedded sensor;

an inclination identification unit configured to acquire an inclination;

an inter-block communication unit configured to transmit or receive signal to or from one or more of the plurality of blocks via a connecting part, where one or more of the plurality of blocks do not have an inter-block communication unit; and an information transmitting unit configured to transmit the information acquired internally to the information processor, and the information transmitting unit is configured to transmit, to the information processor, pieces of information acquired within and transmitted from one or more of the plurality of blocks directly or indirectly connected to the block comprising the information transmitting unit, wherein any of the plurality of blocks that are provided with the inter-block communication unit and are connected to the one or more blocks that do not have the inter-block communication unit transmit internally-acquired information directly or indirectly to any of the plurality of blocks that have the information transmitting unit;

a structural analysis unit configured to calculate a position, posture, and shape of the input apparatus in a three-dimensional space on the basis of the information acquired by the block information receiving unit; and an information processing unit configured to perform the information processing in accordance with a result calculated by the structural analysis unit.

12. An information processing method, comprising processes performed by an information processor of:

receiving information from an input apparatus, wherein the input apparatus includes a plurality of blocks releasably connectable to each other and each block including at least one of:

a position acquisition unit provided with a mechanism to acquire an exact position in a three-dimensional space;

a connecting part identification unit configured to acquire a position to which another block is connected;

a sensor measurement acquisition unit configured to acquire a measurement of an embedded sensor;

an inclination identification unit configured to acquire an inclination;

an inter-block communication unit configured to transmit or receive signal to or from one or more of the plurality of blocks via a connecting part, where one or more of the plurality of blocks do not have an inter-block communication unit; and an information transmitting unit configured to transmit the information acquired internally to the information processor, and the information transmitting unit is configured to transmit, to the information processor, pieces of information acquired within and transmitted from one or more of the plurality of blocks directly or indirectly connected to the block comprising the information transmitting unit, wherein any of the plurality of blocks that are provided with the inter-block communication unit and are connected to the one or more blocks that do not have the inter-block communication unit transmit internally-acquired information directly or indirectly to any of the plurality of blocks that have the information transmitting unit;

acquiring a position of at least one of the plurality of blocks in a three-dimensional space;

calculating a position, posture, and shape of the input apparatus in the three-dimensional space on the basis of information received;

performing information processing in accordance with a calculated result; and displaying a result of information processing on a display apparatus.

13. A computer program embedded on a non-transitory computer-readable recording medium, which when executed by a computer causes the computer to execute actions, comprising:

receiving information from an input apparatus, wherein the input apparatus includes a plurality of blocks releasably connectable to each other and each block including at least one of:

a position acquisition unit provided with a mechanism to acquire an exact position in a three-dimensional space;

a connecting part identification unit configured to acquire a position to which another block is connected;

a sensor measurement acquisition unit configured to acquire a measurement of an embedded sensor;

an inclination identification unit configured to acquire an inclination;

an inter-block communication unit configured to transmit or receive signal to or from one or more of the plurality of blocks via a connecting part, where one or more of the plurality of blocks do not have an inter-block communication unit; and an information transmitting unit configured to transmit the information acquired internally to the information processor, and the information transmitting unit is configured to transmit, to the information processor, pieces of information acquired within and transmitted from one or more of the plurality of blocks directly or indirectly connected to the block comprising the information transmitting unit, wherein any of the plurality of blocks that are provided with the inter-block communication unit and are connected to the one or more blocks that do not have the inter-block communication unit transmit internally-acquired information directly or indirectly to any of the plurality of blocks that have the information transmitting unit;

acquiring a position of at least one of the plurality of blocks in a three-dimensional space;

calculating a position, posture, and shape of the input apparatus in the three-dimensional space on the basis of information received;

performing information processing in accordance with a calculated result; and displaying a result of information processing on a display apparatus.

* * * * *